US009944463B2

(12) United States Patent
Crowley, Jr.

(10) Patent No.: US 9,944,463 B2
(45) Date of Patent: Apr. 17, 2018

(54) MULTITRACK STORAGE SYSTEM WITH CENTRAL TERMINUS

(71) Applicant: Wallace J Crowley, Jr., Lebanon, NJ (US)

(72) Inventor: Wallace J Crowley, Jr., Lebanon, NJ (US)

( * ) Notice: Subject to any disclaimer, the term of this patent is extended or adjusted under 35 U.S.C. 154(b) by 0 days.

(21) Appl. No.: 15/330,440

(22) Filed: Sep. 22, 2016

(65) Prior Publication Data

US 2018/0079593 A1   Mar. 22, 2018

(51) Int. Cl.
  *B65G 1/04* (2006.01)
  *B65G 1/133* (2006.01)

(52) U.S. Cl.
  CPC .......... *B65G 1/0492* (2013.01); *B65G 1/133* (2013.01); *B65G 2814/0301* (2013.01)

(58) Field of Classification Search
  CPC .......... B65G 1/08; B65G 1/133; E04H 13/006
  USPC ....... 414/276, 286, 267, 268, 272, 280, 281, 414/359, 389; 104/35, 45; 52/134, 29, 52/31, 33
  See application file for complete search history.

(56) References Cited

U.S. PATENT DOCUMENTS

| 4,203,368 A | 5/1980 | Haskins |
| 4,347,791 A | 9/1982 | Mandros |
| 4,372,451 A | 2/1983 | Rasmussen |
| 4,966,513 A * | 10/1990 | Motoda ............... B65G 1/02 414/277 |
| 6,202,359 B1 * | 3/2001 | Reed ................ A47B 51/00 312/268 |
| 7,980,181 B2 | 7/2011 | Heaslip et al. |
| 8,578,859 B1 * | 11/2013 | Roy .................. B61B 12/10 104/140 |
| 8,641,354 B2 * | 2/2014 | Tokuyama ........... B65G 1/04 414/253 |
| 8,893,623 B2 | 11/2014 | Gordon |
| 2005/0038575 A1 | 2/2005 | Wu |
| 2014/0015223 A1 | 1/2014 | Banwart |
| 2016/0347544 A1 * | 12/2016 | Kvifte ................. E06C 9/08 |

* cited by examiner

*Primary Examiner* — Mark C Hageman

(57) ABSTRACT

A multitrack storage system, includes: a plurality of different sets of tracks having a base and opposing sidewalls wherein each of the tracks constitute a single groove having a predetermined width and having connections for removably connecting the tracks to one another; an adjustable tilting mechanism in contact with the tracks; a bumper at the distal end of each of the sets of tracks; at least two separate storage trains on different tracks with a plurality of wheeled storage containers, with the storage containers nested in the tracks; a train movement mechanism; a proximal end for the plurality of different sets of tracks wherein all of the plurality of different sets of tracks converge at the proximal end at a central terminus. Users may store items in the wheeled storage containers at the central terminus and then move the storage train away for storage.

19 Claims, 28 Drawing Sheets

MULTITRACK STORAGE SYSTEM WITH CENTRAL TERMINUS

BACKGROUND OF INVENTION a. Field of Invention

The present invention relates to storage systems for personal, business or commercial use, wherein a plurality of single groove tracks terminate at a common central terminus for loading and unloading of stored items from one of a plurality of storage bins. The storage bins are each made up of a plurality of wheeled storage containers that are removably connected to one another, and the tracks are non-horizontal to provide gravity assisted movement in a single direction. Movement in the opposite direction may be motorized, but is preferably accomplished manually. These systems may be used in any environment, but are particularly adaptable to difficult access areas, such as crawl spaces, attics and low overhead areas.

b. Description of Related Art

The following patents are representative of the field pertaining to the present invention:

U.S. Pat. No. 8,893,623 B2 to Gordon describes a multitrack multi-vehicle coaster that simulates a popular theme of a competition, struggle or conflict taken from history or fiction. The vehicles interact with each other and interact with the ride scenery in many different ways. The vehicle velocity is altered at different points in the ride using multiple motors and brakes. An interactive queue is provided and allows people in the queue to interact with people on the ride. Energy recycling and computer ride control are also disclosed.

U.S. Pat. No. 7,980,181 B2 to Heaslip et al. describes a drag racing roller coaster amusement ride that has at least two sets running rails, each set having at least one running rail and an embark point. At least two carriers (109) are arranged to carry at least one rider on a respective set of running rails with the rider(s) in a substantially prone position. Each carrier is arranged to slidingly engage with the respective set of running rails to enable the carriers to traverse the ride. The ride has an indicator (109) to provide a ride commencement indication. A launch system is configured to provide a powered initial motion to each carrier. Each carrier has a ride activator controllable by a rider of the carrier to trigger the launch system to commence the ride for the carrier following the ride commencement indication. Launch systems are also disclosed.

U.S. Pat. No. 4,372,451 to Rasmussen et al. describes a gravity-feed merchandise storage and delivery rack that includes upstanding support columns and a plurality of vertically-spaced storage shelves mounted upon the support columns by means of mounting clips; each storage shelf includes rearward and forward side frame members interconnected by splice members including offset portions so that the forward side frame member is offset outwardly with respect to the rearward side frame member to facilitate passage of merchandise thereby; an intermediate guide member on the storage shelf having a pin adjustably positioned thereon and extending downwardly therefrom to engage in openings in a channel member extending transversely of the storage shelf; and a shelf support infinitely adjustable upon an intermediate support column for supporting an elongated storage shelf intermediate the front and rear thereof.

U.S. Pat. No. 4,347,791 to Mandros describes a guideway system for cargo including vehicles is provided wherein a carriage glides on a rail mounted in a channel. The rail has compressed air discharge ports and vacuum intake ports positioned longitudinally therealong. The compressed air ports emit sufficient air to provide an air support cushion under the carriage and to impart positive air pressure behind it while the vacuum ports reduce the air pressure forward of the carriage to create an air pressure differential that propels the carriage along such rail. Vehicles drive onto a carriage, are secured in place and are conveyed to a desired station on such carriage. The vehicle then unloads from the carriage and drives off to its final destination. Similarly, other cargo is loaded onto a carriage and unloaded at its destination. In another embodiment, the carriage has a longitudinal slot in its underbody adjacent its support rail and compressed air is discharged from ports in the rail at the forward portion of the slot to propel the carriage along the rail.

U.S. Pat. No. 4,203,368 to Haskins describes an apparatus for moving loads from one position to another, employing an arrangement of a plurality of loop and/or spur tracks supported from above and having terminals converging in a direction of a pivot point having secured thereat a radial transfer track having a free swinging end adapted to couple with any of the loop and/or spur tracks to effect transfer of a hoisted load supported on one of the tracks, to another track via the radial transfer track. The radial transfer track is supported, adjacent its swinging end, on an arcuate support track which is concentric to an arcuate line passing through all of the converging terminals of the loop and/or spur tracks.

U.S. Patent Application Publication No. 2014/0015223 A1 to Banwart describes a powered converter trolley for movement and attachment of trailers that is provided. The trolley comprises a conventional converter trolley having a drawbar. The trolley has a power supply and operates as a towing device. The trolley connects to a freight trailer and can be raised or lowered from a stored position to a ground-engaging, working position. Alternatively, the wheels of the trolley may be powered for providing motion to the trolley. The trolley further comprises several attachment devices for securing the trolley to an intermodal railcar, including alternative hydraulic, mechanical, and electrically-powered tie down devices. A trolley movable along a railcar is provided for securing the trolley or trailer to the railcar and includes a hitch component for selectively interconnecting to a hitch component on the trolley or trailer.

U.S. Patent Application Publication No. 2005/0038575 A1 to Wu describes an autonomous personal transportation system for moving passengers and light freights which is constructed with a track network and small vehicles on the track network. There are a number of stations and stops for loading and unloading on side tracks off the mainline of the track network. The vehicle width is limited to a dimension for one seat. The vehicles can be coupled statically or dynamically to form a train. The track has side rails for the rigid wheels of the vehicle and a central rail for centering the vehicle on the guideway and providing additional acceleration and braking capability. The control system for the movement of vehicles is divided into three levels: the central control system, the wayside control system and the vehicle control system.

Notwithstanding the prior art, the present invention is neither taught nor rendered obvious thereby.

SUMMARY OF INVENTION

The present invention relates to a multitrack storage system with a central terminus, which comprises: a) a plurality of different sets of tracks having a track base and opposing sidewalls for guiding a plurality of separate, wheeled storage bins, wherein each of the tracks constitute a groove having a predetermined width of at least X, wherein X is a width in the range of about six inches to about five feet, and having connection mechanisms for connecting the tracks to one another, the tracks having a proximal end and a distal end; b) a tilting mechanism in contact with at least a portion of the tracks, the tilting mechanism being adjustable to alter the angle of the tracks to a non-horizontal position; c) a distal end bumper at the distal end of each of the sets of tracks to prevent off track movement of any of the storage bins that may be moved thereon; d) the plurality of separate, wheeled storage bins, being positioned on the different sets of tracks, each storage bin having a plurality of bottom wheels and a plurality of side wheels wherein the maximum outside width of the bins, including the side wheels, as measured side to side, is less than X such that the side wheels of the storage bins nest in the tracks, the storage bin side wheels having a non-vertical axis of rotation within the range of minus 45 degrees to plus 45 degrees from horizontal, and nesting on the track base; e) a bin movement mechanism connected to at least one separate, wheeled storage bin for movement thereof, and f) a proximal end for the plurality of different sets of tracks wherein the plurality of different sets of tracks converge at the proximal end at central terminus; wherein, a user may store items in the wheeled storage bins at the central terminus and then move the storage bins along one of the plurality of different sets of tracks away from the central terminus for storage.

In some embodiments of the present invention multitrack storage system, the central terminus is a turnstile that may be rotated to receive storage bins from any of the plurality of sets of tracks.

In some embodiments of the present invention multitrack storage system, the central terminus is a manifold with a plurality of converging tracks adapted to connect to each of the plurality of different sets of tracks that are reduced in number to a fewer set of tracts by the manifold.

In some embodiments of the present invention multitrack storage system, the tilting mechanism is selected from the group consisting of: (a) a ratcheted frame; (b) a lever jack; (c) a screw jack; (d) an adjustable wedge; and (e) a fixed wedge.

In some embodiments of the present invention multitrack storage system, the tilting mechanism is a plurality of adjustable height stilts connected to the tracks.

In some embodiments of the present invention multitrack storage system, the tracks have vertical sidewalls.

In some embodiments of the present invention multitrack storage system, the tracks have sidewalls angled outwardly from the base at angles in excess of 90 degrees.

In some embodiments of the present invention multitrack storage system, the wheeled storage bins include lids.

In some embodiments of the present invention multitrack storage system, the tracks are structurally formed of materials selected from the group consisting of wood, metal, plastic and combinations thereof.

In some embodiments of the present invention multitrack storage system, the bin movement mechanism includes at least one flexible cord having a distal end away from the central terminus and a proximal end at the central terminus.

In some embodiments of the present invention multitrack storage system, each storage bin has a distal end away from the central terminus and a proximal end closest to the central terminus, and at least one flexible cord is connected to the distal end of the bin and there is a pulley at the distal end of the track whereby the cord travels from the distal end of the storage bin to the pulley and then returning to the central terminus.

In some embodiments of the present invention multitrack storage system, each storage bin has a distal end away from the central terminus and a proximal end closest to the central terminus, and the at least one flexible cord is connected to the proximal end of the bin and travels from the proximal end of the storage bin to the central terminus.

In some embodiments of the present invention multitrack storage system, each of the storage bins further includes side wheels having a non-horizontal axis of rotation.

In some embodiments of the present invention multitrack storage system, the side wheels have a vertical axis of rotation.

In some embodiments of the present invention multitrack storage system, the bin movement mechanism is a motorized bin movement mechanism.

In some embodiments of the present invention multitrack storage system, the plurality of different sets of tracks includes at least one set of branch tracks and at least one switch gate.

In some embodiments of the present invention multitrack storage system, the switch gate is manually operable.

In some embodiments of the present invention multitrack storage system, the switch gate is a motorized switch gate.

In some embodiments of the present invention multitrack storage system, the motorized switch gate includes a transmitter and a receiver and is wirelessly operable.

In some embodiments of the present invention multitrack storage system, the plurality of different sets of tracks includes at least one set of tracks at a first level, being a first floor level, and at least one set of tracks at a second level, being a second floor level. In some of these embodiments of the present invention multitrack storage system, the multitrack storage system further includes at least one bin transporting elevator lift to move the storage bins from the first floor level to the second floor level and vice versa. In some of these embodiments of the present invention multitrack storage system, the elevator lift includes a tray and a power winch.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
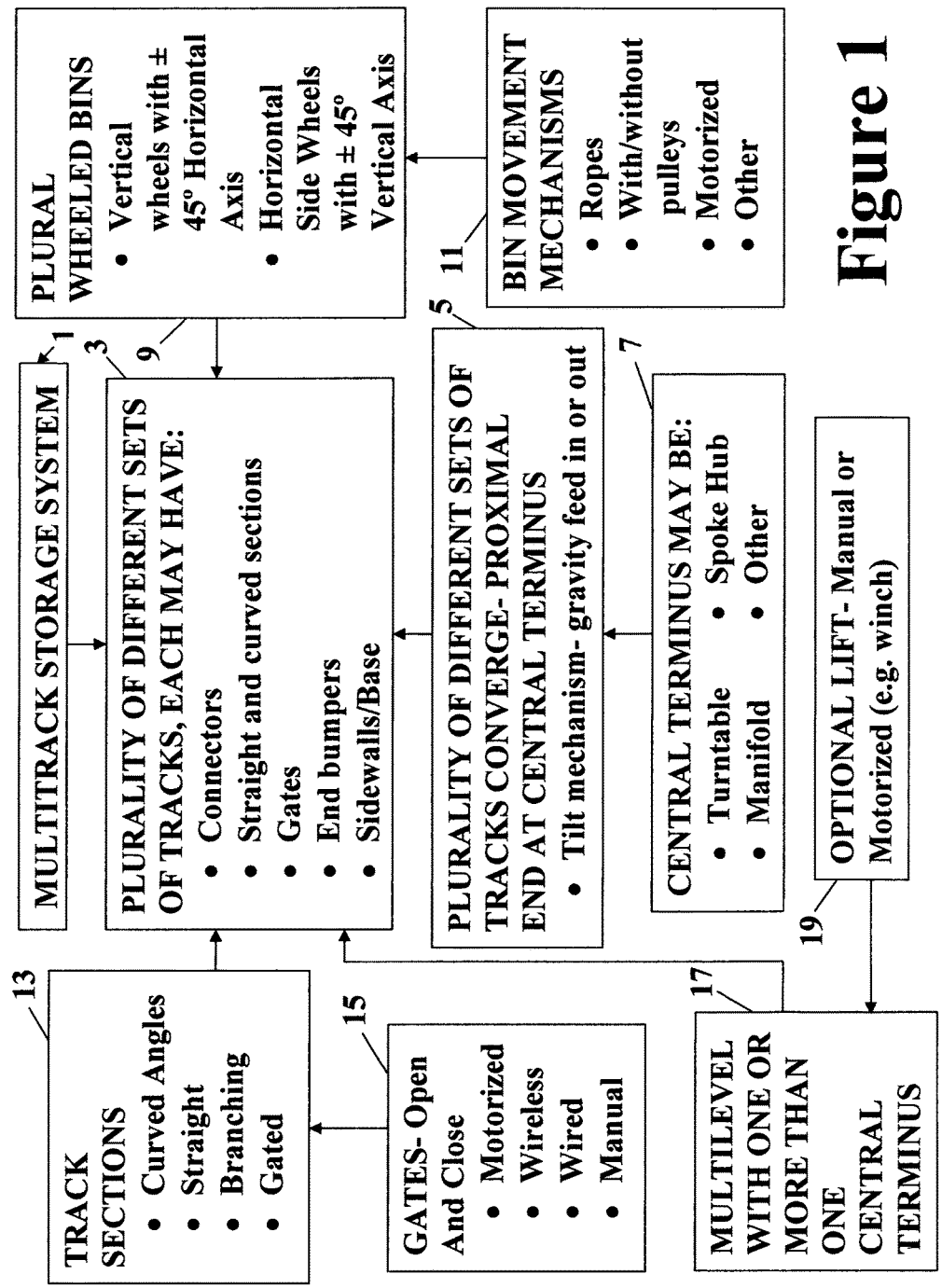
FIG. 1 is a block diagram showing some of the features and options of the present invention multitrack storage system.

Referring now in detail to the drawings wherein like reference numerals designate corresponding parts throughout the several views, various embodiments of the present invention are shown. By way of definition, the terms "track", "tracks" and "multitrack" refer to guideway(s) that have sufficient flat pathways to accommodate free moving wheeled cargo and storage containers referred to herein as "bins". These words are not intended to mean railroad tracks, but rather open roadway or pathway sections. These present invention tracks have side rails, intended to act as bumpers for the bins. Thus, the tracks have main bases (bottoms), and side rails that deflect and guide moving bins.

FIG. 1 is a block diagram showing some of the features and options of the present invention multitrack storage system. Block 1 is the overview present invention multitrack storage system. The present invention storage system, block 1, may be smaller with narrower tracks or wider, with wider tracts, and correspondingly slightly less wide bins. The plurality of different sets of tracks, block 3, has a track base and opposing sidewalls for guiding a plurality of separate, wheeled storage bins, block 9, wherein each of the tracks constitute a groove having a predetermined width of at least X, wherein X is a width in the range of about six inches to about five feet, and have connection mechanisms for connecting the tracks to one another, and these present invention tracks having a proximal end and a distal end. They may be made of wood, plastic, metal or combinations thereof. Further, the tracks, block 3, may have connectors wherein setoff tracks connect to one another by converging anywhere along a set, have distal end bumpers, and have straight, as well as curved sections. The tracks may connect to one another as by simple matching abutment areas, or by more complex connectors such as latches, snap-ins, screws, etc.

Again referring to FIG. 1, the plurality of different sets of tracts converges at a common proximal end at a central terminus, block 5. In order to persuade bins away from or toward the central terminus for moving the bins down the track for storage or removal from storage, or at least to prevent bins from running off the central terminus, it is useful to have one or more tracks tilt away from or toward the proximal end central terminus. Preferred tilting mechanisms are selected from the group consisting of: (a) a ratcheted frame; (b) a lever jack; (c) a screw jack; (d) an adjustable wedge; and (e) a fixed wedge. The central terminus itself, block 7, may be a turntable, a manifold, a spoke hub, plural of these, combinations of these or otherwise as may now be apparent to the artisan.

In FIG. 1, the plural wheeled bins, block 9, may or may not have covers, but preferably do have covers. These wheeled bins have vertical wheels, i.e., wheels that rest on the ground, floor, and base of the tracks, and although referred to as vertical wheels, do have to actually be vertical, but have an axis of rotation (an axle) of up to 45 degrees above or below horizontal plane. Preferred are with the range of 20 degrees above or below horizon plane. Most preferred are vertical or close to vertical wheels. They are required to be located, at least in part, below the bin structure to lift the bin off ground for easy movement and transport, especially up and down the tracks. There are optional, but preferred, horizontal wheels as well. The horizontal wheels rest on the sidewalls or at least act as a smooth movement buffer between the sidewall of the tracks and the bins. Thus, these wheels protrude at least partially sideways outside the bin to have the bins roll along the track sidewalls rather than scrape, drag or get stuck on the sidewalls. These horizontal wheels do not have to be exactly horizontal, but do have to act and be positioned on sidewall of the bin to act as side guides rather than bottom guides for the bin to moves smoothly. They may have an axis of rotation of up to 45 degrees above or below vertical plane. Preferred are with the range of 20 degrees above or below vertical plane. Most preferred are horizontal or close to horizon wheels. These may be on the bin or below the bin, but must be higher than the bottoms of the vertical wheels.

The plurality of bins, block 9, are not required to be connected to one another, but in some embodiments, may be. However, if the tracts are tilted upward away from the terminal then the front bin may have a rope, cable, rod, hook and pole or any other mechanism, block 11. The bin movement mechanisms are set up so that the movement of one bin will pull or push any other bins along the same track. For example, if a track is tilted upwardly and away then the proximal bin may be connected to a rope that travels under the subsequent bins and all bins are pulled up by pulling the rope and are lowered by controllably releasing the rope. In these instances, the rope may run from the front bin (proximal bin) to the far end (distal end) of the track and travel around a pulley and back to the proximal end. Conversely, if the track is tilted downwardly away from the proximal end of the track, then a rope will be attached to the furthest bin and all bins would be brought back to the proximal end and central terminus by pulling the rope towards the central terminus. In place of ropes, any other mechanism could be used, such as chains, chords, ratchets, pump ratchets, or any other pull or push means. They're generally manual, but could be proximal.

The track sections, block 13, may be curved angled sections, straight sections, straight sections with branches, curved sections with branches and will have end bumpers on the furthest section (distal section) of track. These tracks with branches may have optional gates that swing back and forth to open and close the branches. Such gates may be manually operated, motorized or combinations and may, in some embodiments, be driven wirelessly or by wired controls, block 15.

The pluralities of different sets of tracks, in many embodiments, are located on a single level, such as an attic floor or a crawl space floor, or otherwise. However, in some embodiments two or more levels of tracks may be used. These multilevel track sections, block 17, may have one central terminus or may have more than one, on each or different levels. There may be two levels or more than two levels and the footprints of the tracks on these different levels may be the same or different. Thus, optimally in a room that has a flat ceiling the different level tracks will preferably have the same footprint. On the other hand, in a structure such as a sloped roof attic, optimally, each level will have the maximum number of tracks for the cross sections at that level and will thus have different footprints at different levels.

Figure 2:
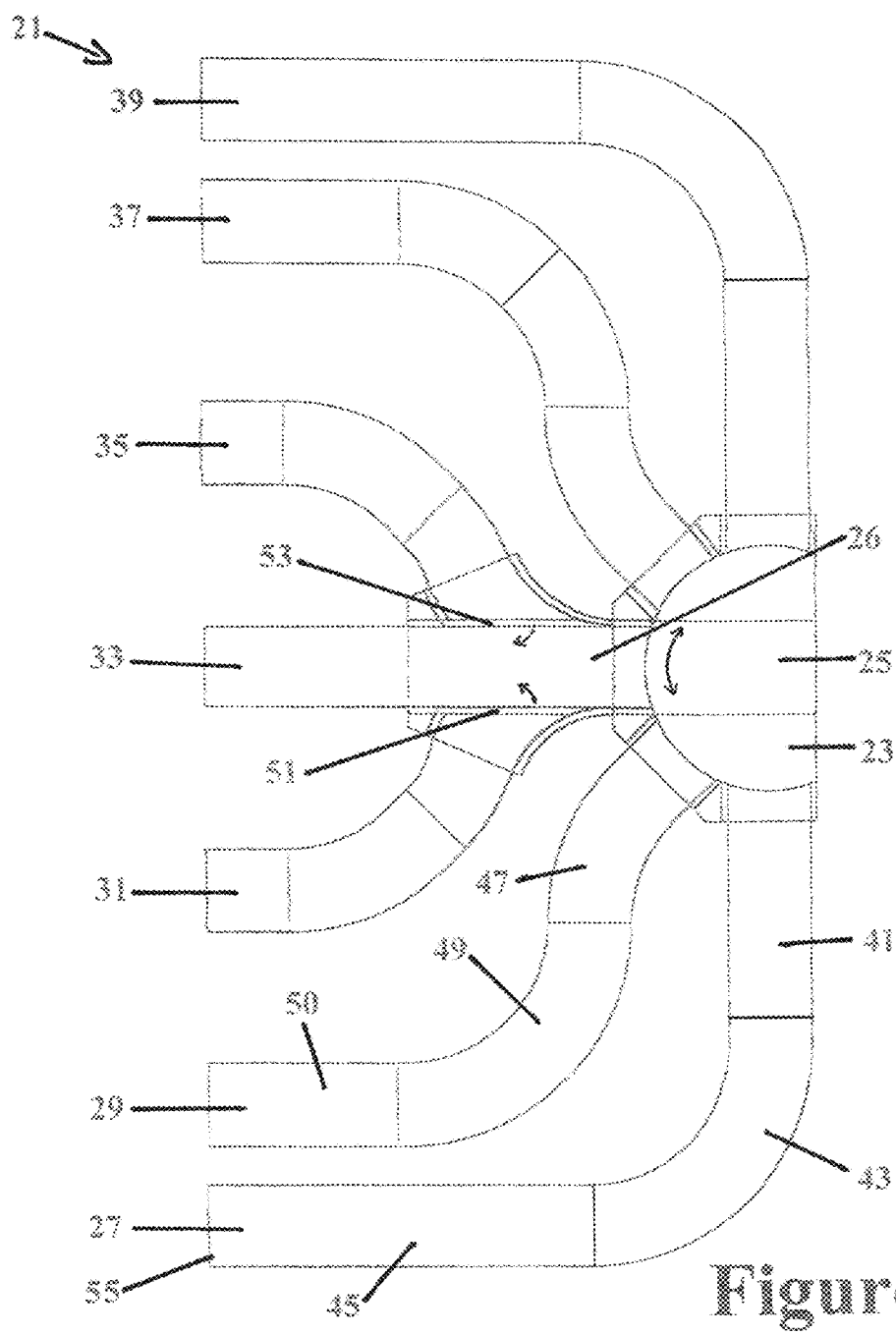
FIG. 2 illustrates a top view of one potential layout arrangement of a present invention multitrack storage system.

FIG. 2 illustrates a top view of one potential layout arrangement of a present invention multitrack storage system 21. This includes a turntable 23 and a delivery tray 25, that are rotated together to align with different tracks. This turntable 23 is the central terminus and is connected to the proximal end of seven sets of tracks. Track set 27 has, as shown a straight section at its beginning and other straight sections, including a distal end section with bumper 55. Between the straight sections is 90 degree track section 43. Track 29 has curved sections and straight sections, and, like track 27, is directly connected to turntable 23. Likewise, tracks 33, 37 and 39 are directly connected to turntable 23. While FIG. 2 is merely illustrative, it does include one track, track 33, which has branches. Thus, track 33 has left branch track 31 and right branch track 35. Separately operable gates 51 and 53 control bin flow. When gate 51 is closed and gate 53 is closed, as shown, bins can only flow on track 33. When gate 51 is open and gate 53 is closed bins can only flow on track 31. When gate 51 is closed and gate 53 is open, bins can only flow on track 35.

Figure 3:
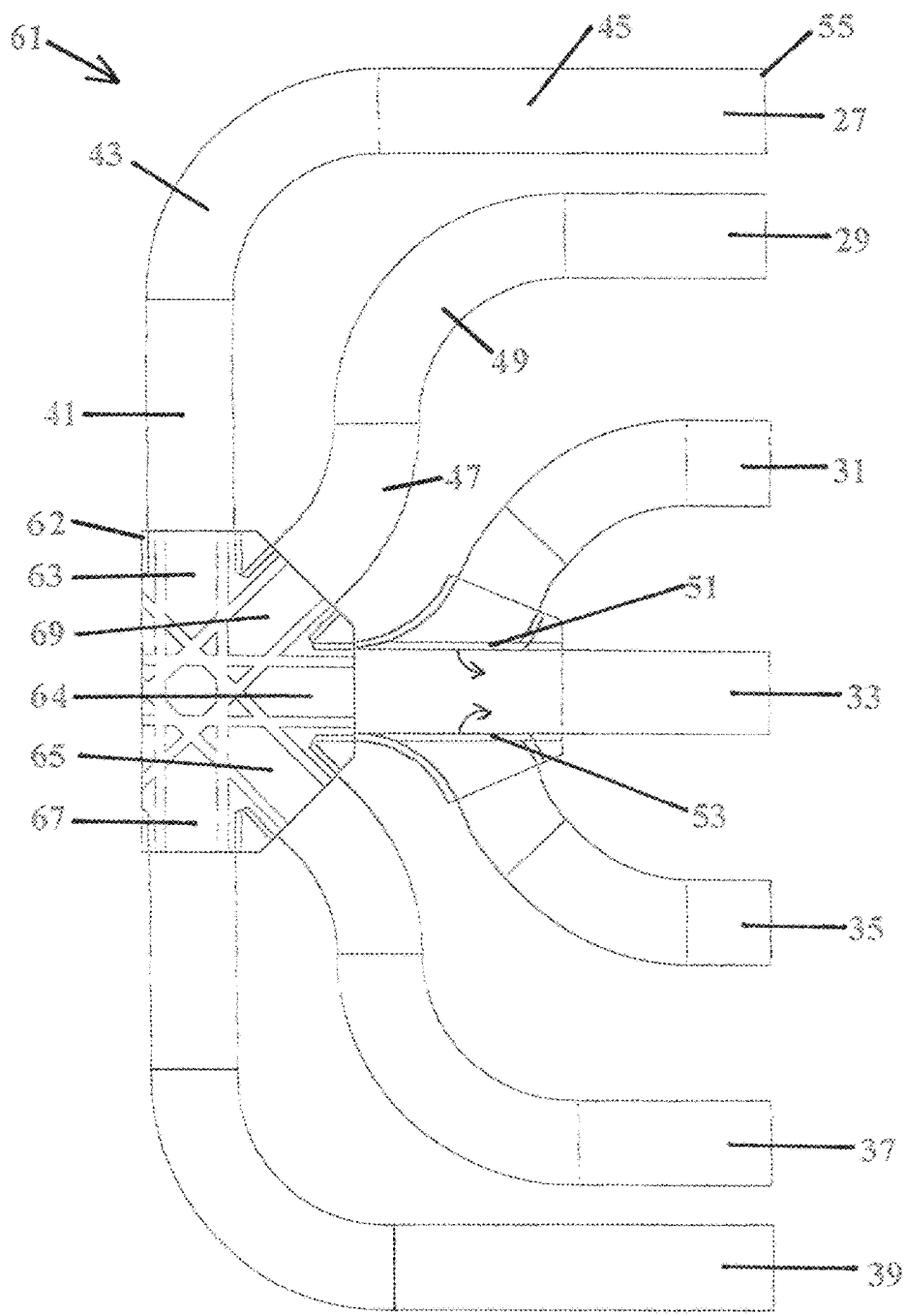
FIG. 3 is a different potential layout arrangement of a present invention multitrack storage system.

FIG. 3 is a different potential layout arrangement of a present invention multitrack storage system 61. All of the parts shown in FIG. 2 that are also shown in FIG. 3 are identically numbered and need not be re-identified here. What is different is the central terminus for system 61. Instead of a turntable, as shown in FIG. 2, here is a fixed manifold 62 that enables wheeled bins to be placed on any one of five different sets of grooves, such as grooves 64, 69, 65, 63 and 67. Otherwise, system 61 works similarly to system 21 of FIG. 2 described above.

Figure 4:
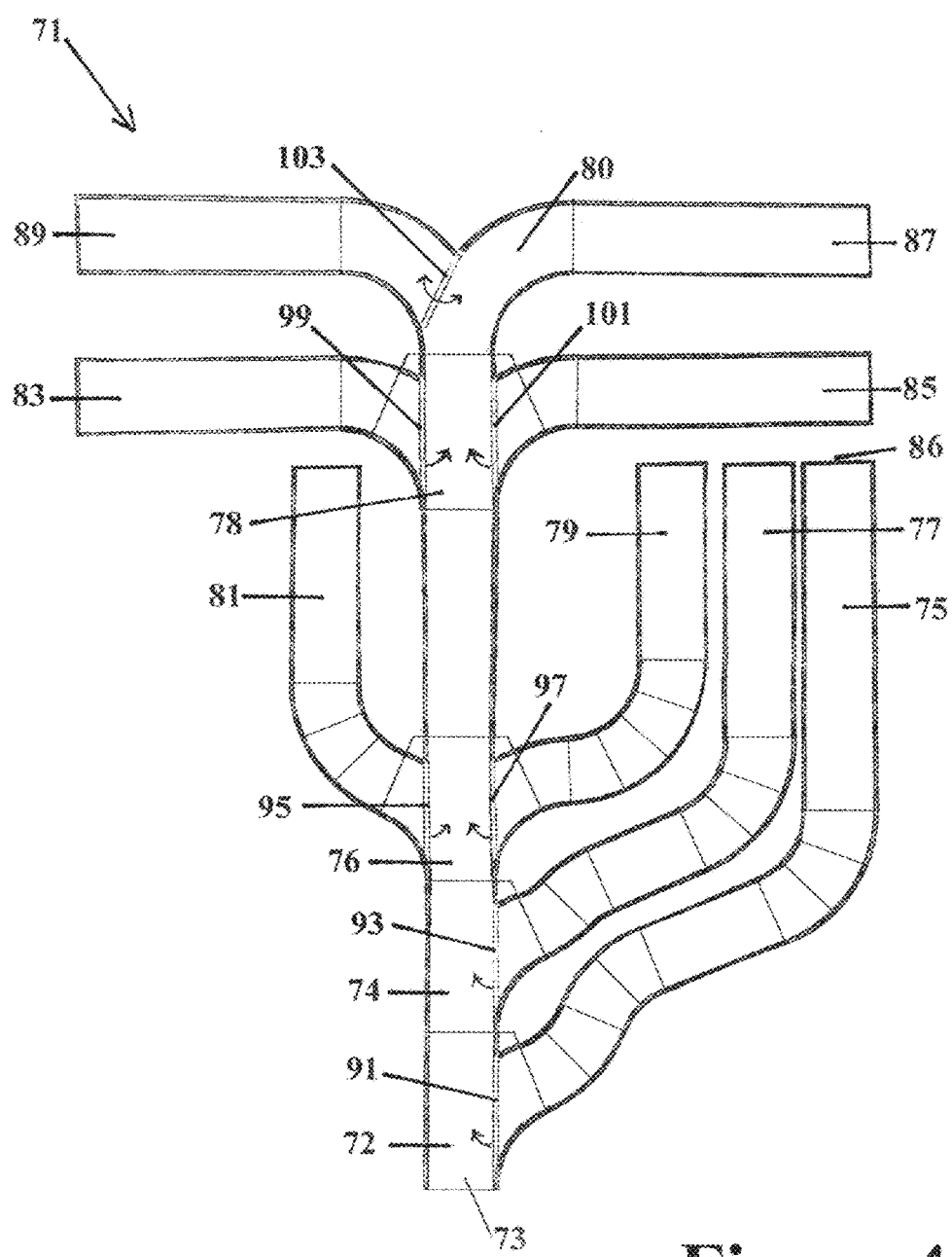
FIG. 4 is a third potential layout arrangement of a present invention multitrack storage system.

FIG. 4 is a third potential layout arrangement of a present invention multitrack storage system. It includes 5 switching systems along with 8 branch tracks traveling in different directions with a central backbone track acting as a manifold. System 71 includes central terminus manifold track proximal end 73 on right turn switch 72, truncating into right turn switch 74, tri-path switch 76, tri-path switch 78 and split-T switch 80. The 5 switches have gates 91, 93, 95, 97, 99, 101 and 103. System 71 includes 8 distal end branch tracks 75, 77, 79, 81, 83, 85, 87 and 89. Track 75 has a terminating end 86 and each of the tracks have the same terminating end 86 (not shown).

Figure 5:
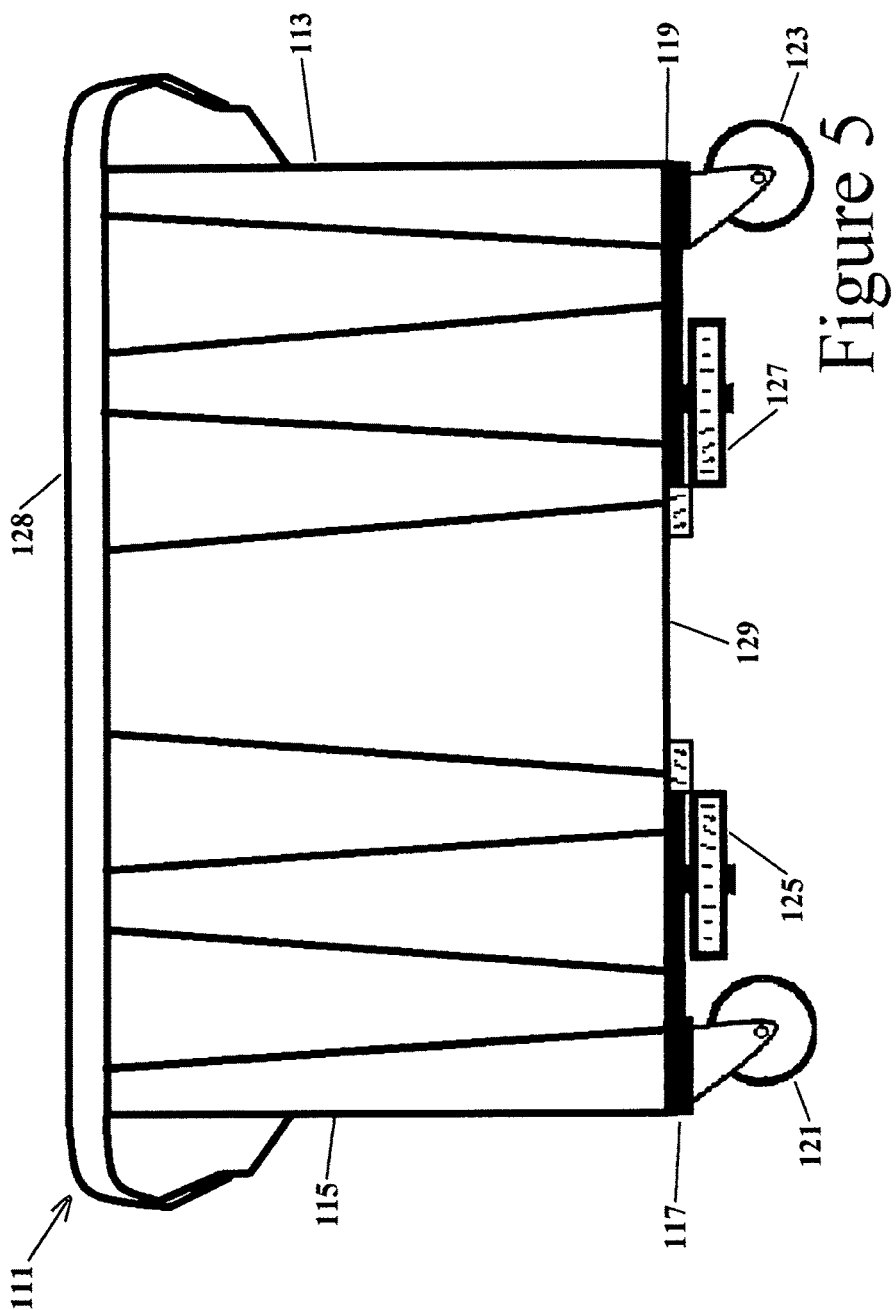
FIGS. 5 and 6 are side and bottom views of one possible wheeled storage bin for use in the present invention multitrack storage system.
Figure 6:
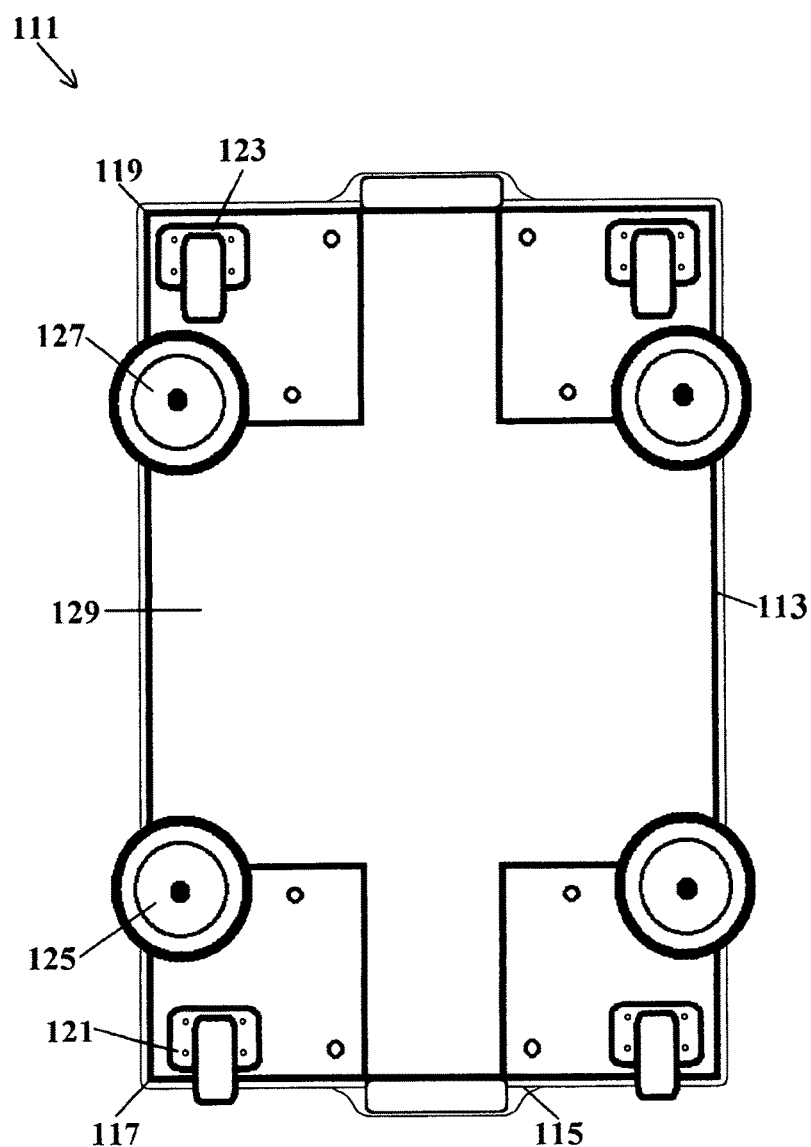

FIGS. 5 and 6 are side and bottom views of one possible wheeled storage bin 111 for use in the present invention multitrack storage systems, such as are described above and below. Identical parts are identically numbered in FIGS. 5 and 6 and these Figures are discussed collectively. Bin 111 has side walls 113 and 115, lid 128 and bottom 129. Bottom 129 has four corners such as corner 117 and 119, and all four corners include vertical wheels and horizontal (side bumper) wheels. Corner 117 has vertical wheel 121 and horizontal wheel 125. Corner 119 has vertical wheel 123 and horizontal wheel 127 the other two (unnumbered) corners have symmetrically identical wheels. In this embodiment, the vertical wheels are castor wheels and rotate on a horizontal axis and the horizontal axis has brackets that rotate on a vertical axis. The horizontal wheels may be on bottom 129, as shown or may be attached to the bin side walls. In either case, two requirements are essential: first these horizontal wheels must protrude beyond the top footprint of the bins to be the first contact component against walls, track walls or other above four obstacles, and second, they must be higher than the bottoms of the vertical wheels so as to not scrape along floors, tracks or other ground units upon which the bins may move. FIG. 5 also shows the lid 128 which is not visible on FIG. 6.

Figure 7:
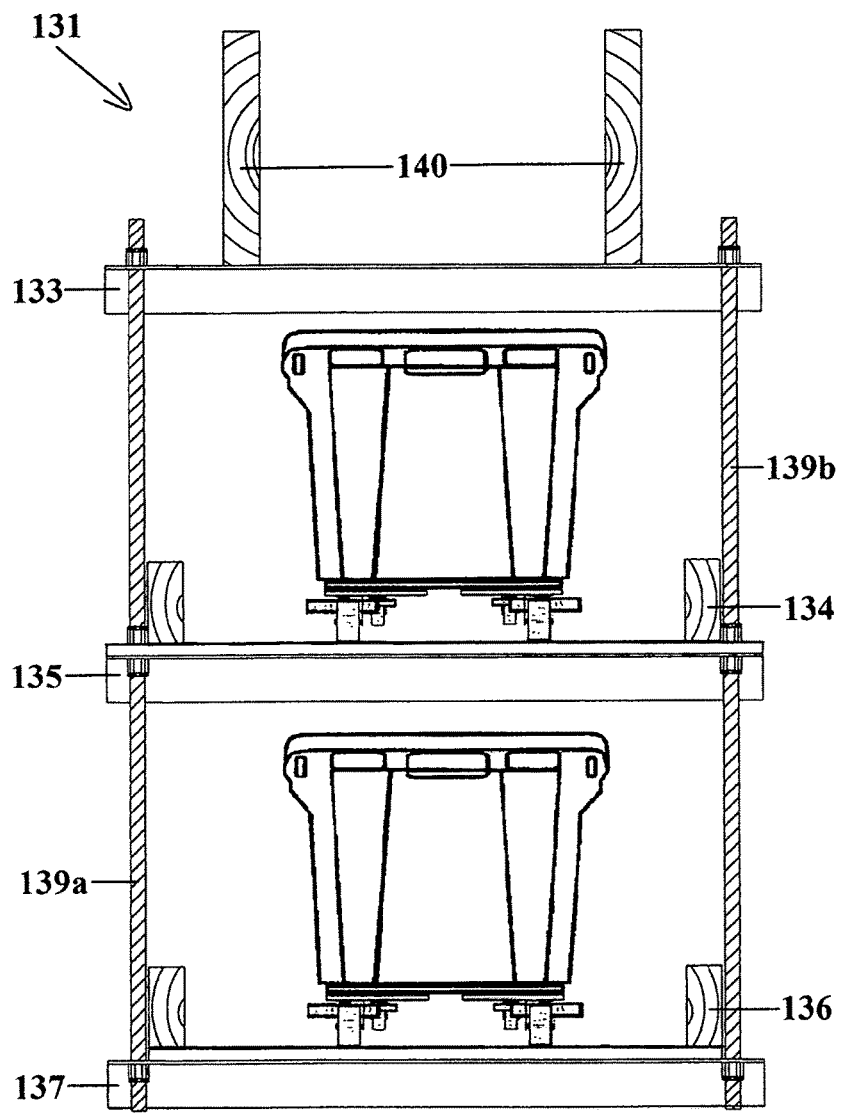
FIG. 7 shows front view of a multilevel track system hanging from floor joists of the present invention multitrack storage system.

FIG. 7 shows front view of a multilevel track system of the present invention multitrack storage system 131. System 131 is a suspended system hanging from joists such as joist 140. Alternatively, it could be a multilevel system that is resting on a floor or foundation. It includes a first level track 133 and a second level track 135, as well as connecting rods that are single rods passing through both levels such as the rod shown as lower segment rod 139a and upper segment rod 139b. This figure represents a cross section of one set of tracks that may be similar to those described with respect to prior figures.

Figure 8:
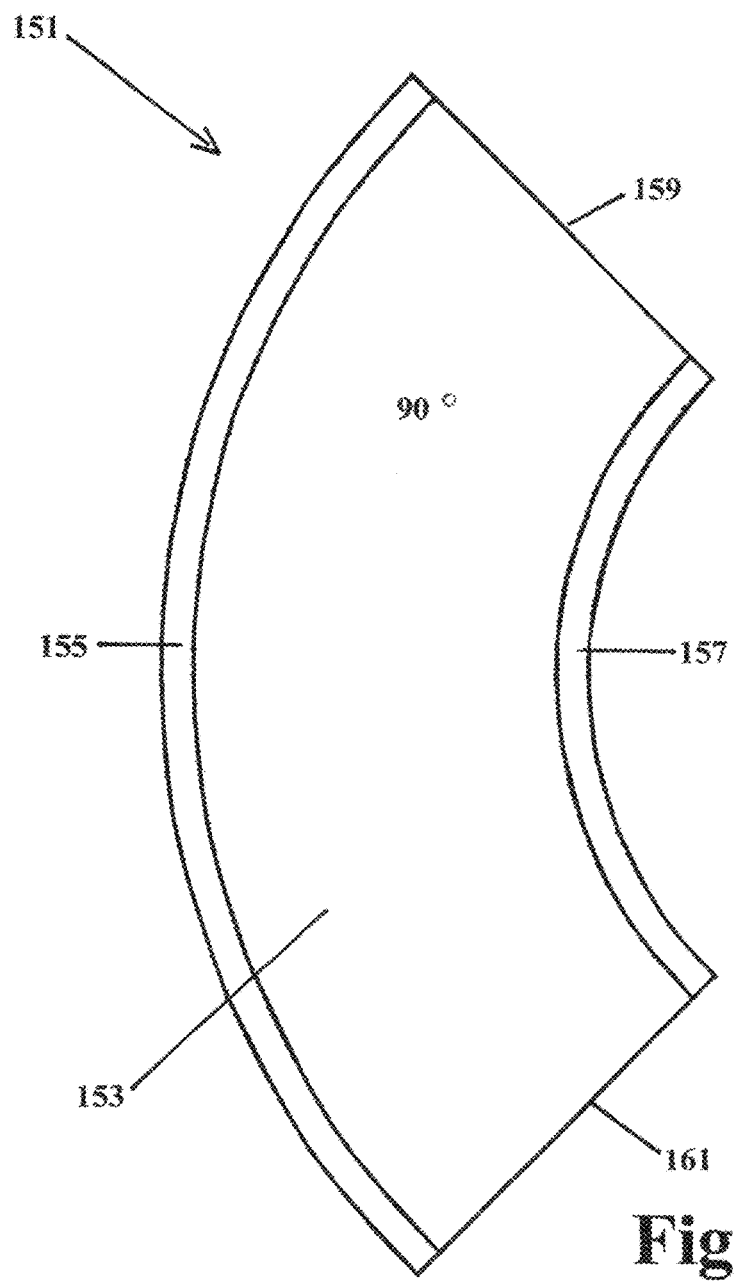
FIG. 8 shows one example of a 90 degree corner section of the present invention multitrack storage system.

FIG. 8 shows one example of a 90 degree corner section 151 of the present invention multitrack storage system. Section 151 has a main base 153, side rails 155 and 157, and ends 159 and 161. These ends are at 90 degrees relative to one another and are used to connect other straight or curved track sections to establish a present invention track system.

Figure 9:
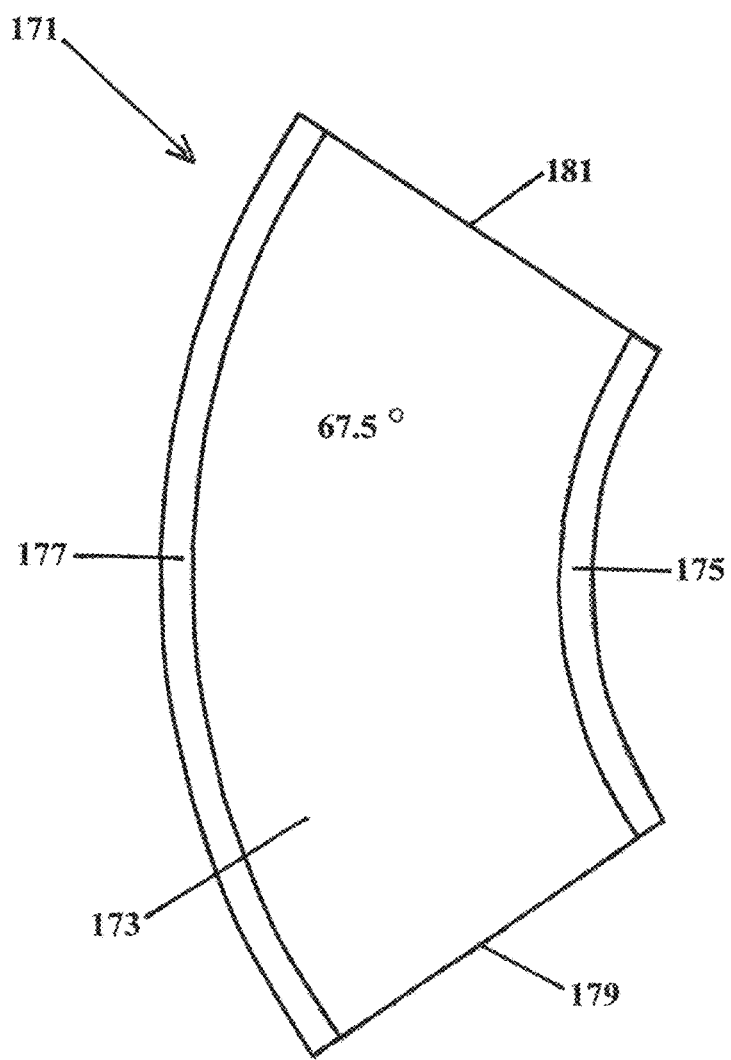
FIG. 9 shows one example of a 67 ½ degree corner section of the present invention multitrack storage system.

FIG. 9 shows one example of a 67.5 degree corner section of 171 of the present invention multitrack storage system. Section 171 has a main base 173, side rails 175 and 177, and ends 179 and 181. These ends are at 67.5 degrees relative to one another and are used to connect other straight or curved track sections to establish a present invention multitrack storage system.

Figure 10:
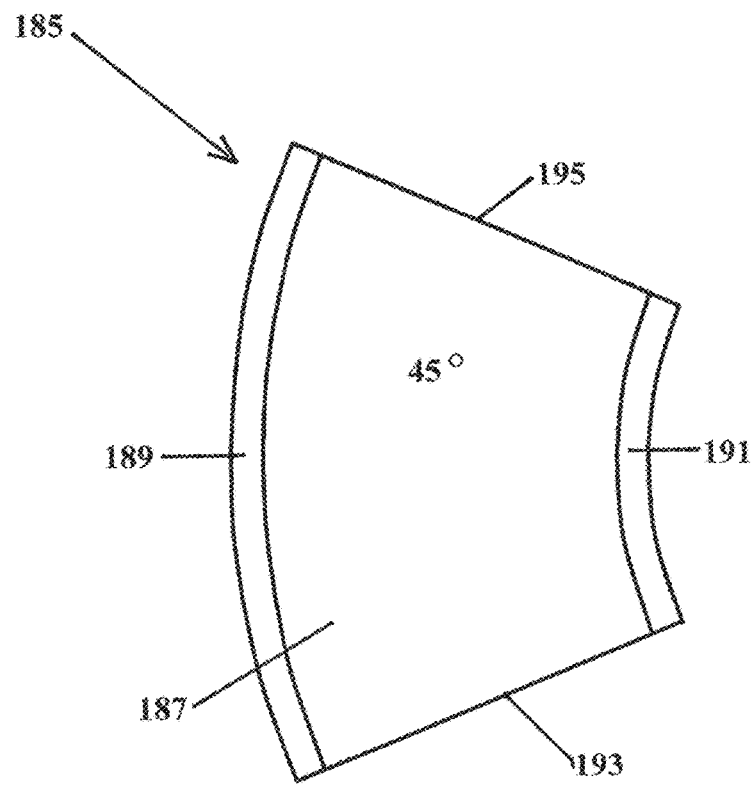
FIG. 10 shows one example of a 45 degree corner section of the present invention multitrack storage system.

FIG. 10 shows one example of a 45 degree corner section 185 of the present invention multitrack storage system; Section 185 has a main base 187, side rails 189 and 191, and ends 193 and 195. These ends are at 45 degrees relative to one another and are used to connect other straight or curved track sections to establish a present invention track system.

Figure 11:
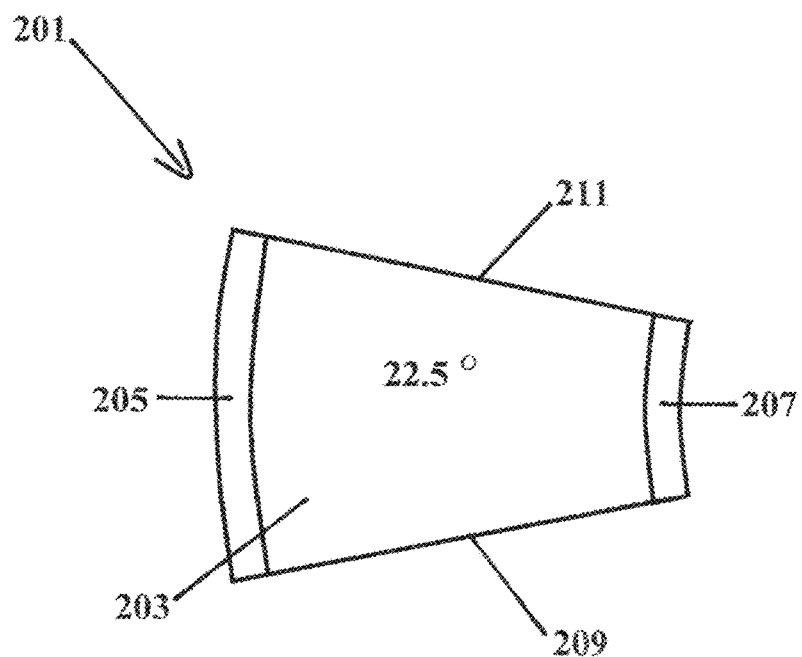
FIG. 11 shows one example of a 22 ½ degree corner section of the present invention multitrack storage system.

FIG. 11 shows one example of a 22.5 degree corner section 201 of the present invention multitrack storage system. Section 201 has a main base 203, side rails 205 and 207, and ends 209 and 211. These ends are at 22.5 degrees relative to one another and are used to connect other straight or curved track sections to establish a present invention track system.

Figure 12:
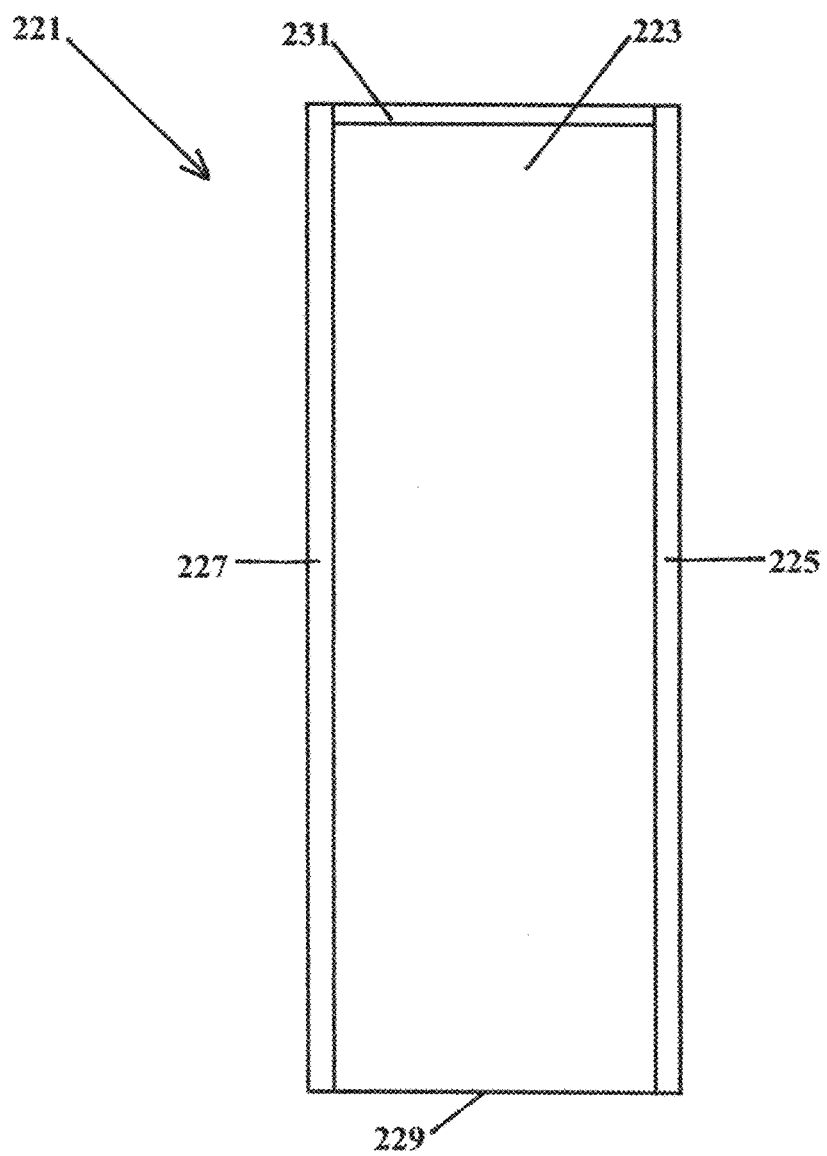
FIG. 12 shows one example of a terminating track section of the present invention multitrack storage system.

FIG. 12 shows one example of a terminating track section 221 of the present invention multitrack storage system. Section 221 has a main base 223, side rails 225 and 227, and an open proximal end 229 and a closed distal end with bumper rail 231. These ends are parallel relative to one another and are used to connect other straight or curved track sections to establish a present invention track system.

Figure 13:
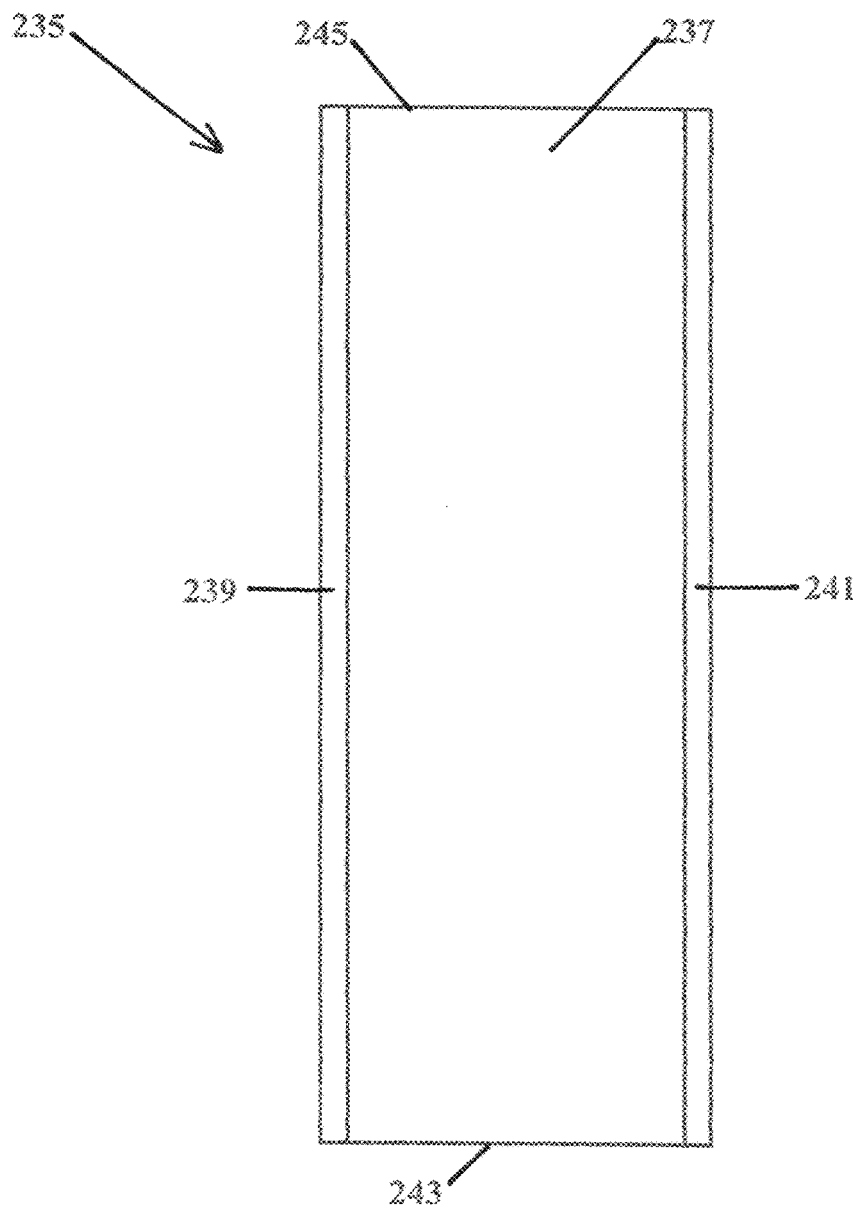
FIG. 13 shows one example of a regular track section of the present invention multitrack storage system.

FIG. 13 shows one example of a regular track section 235 of the present invention multitrack storage system. Section 235 has a main base 237, side rails 239 and 241, and open proximal end 243 and distal end 245. These ends are parallel relative to one another are used to connect other straight or curved track sections to establish a present invention multitrack storage system.

Figure 14:
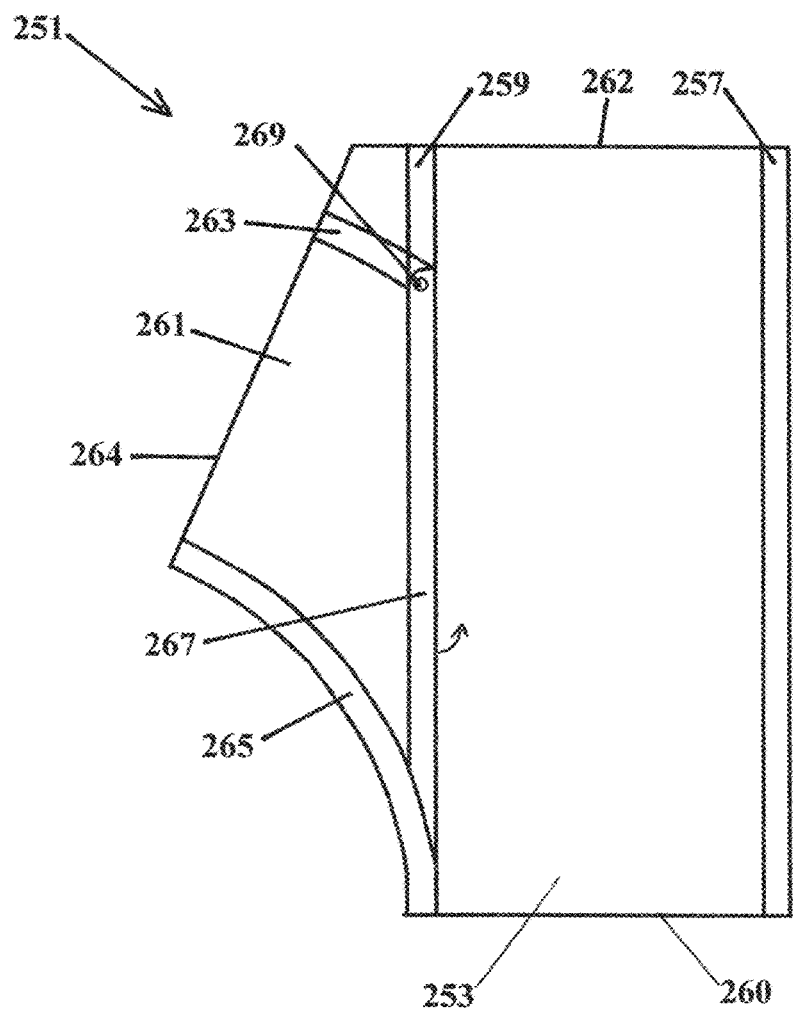
FIG. 14 shows one example of a left exit system connecting track section of the present invention multitrack storage system.

FIG. 14 shows one example of a left exit system connecting track section 251 of the present invention multitrack storage system. Section 251 has a main base 253 and a left branch base 261. Straight rails 257 and 259 are on opposing sides of base 253, and left branch base 261 has side rails 263 and 265. Open proximal end 260 and distal end 262 which are 90 degrees relative to one another and distal end 264 which is 22.5 degrees are used to connect other straight or curved track sections to establish a present invention multitrack storage system. Rail 259 and side rail 263 has a gap for left exit with gate 267 positioned in the gap. Gate 267 may be moved in an arc with hinge member 269 so as to close the main track and open a left exit or vise versa. Gate 267 may be operated manually or by motor or electromagnetic, by wire or wirelessly.

Figure 15:
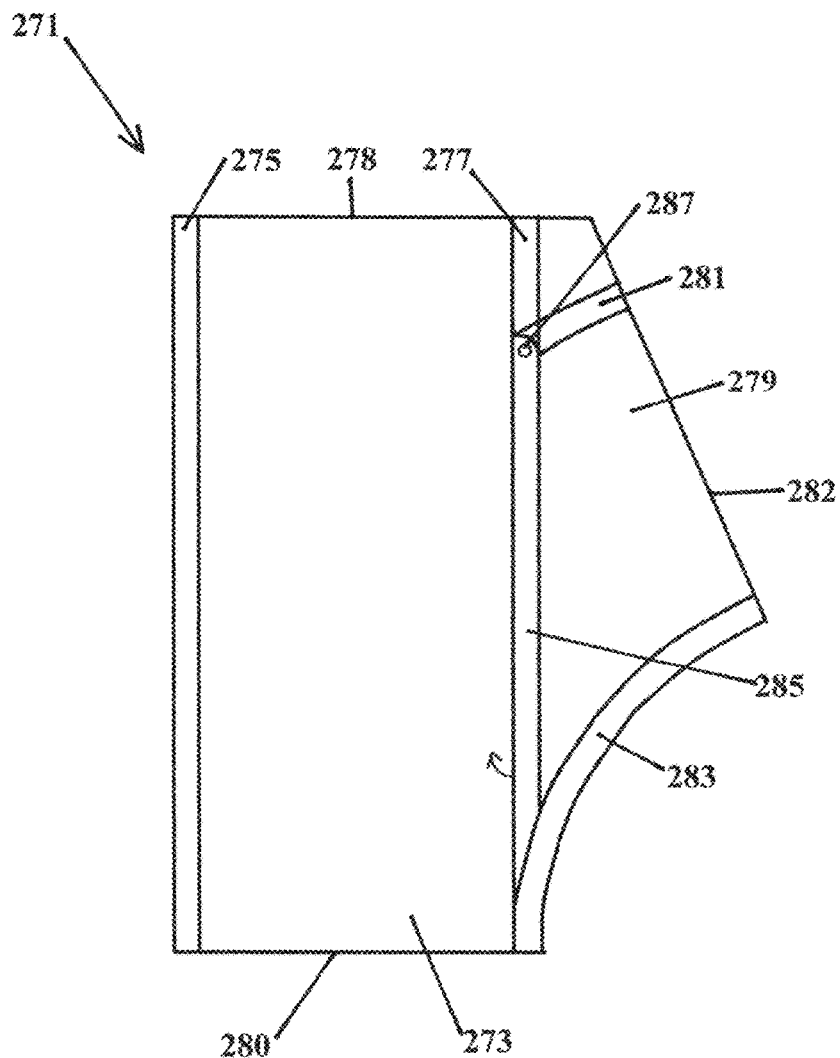
FIG. 15 shows one example of a right exit system connecting track section of the present invention multitrack storage system.

FIG. 15 shows one example of a right exit system connecting track section 271 of the present invention multitrack storage system. Section 271 has a main base 273 and a right branch base 279. Straight rails 275 and 277 are on opposing sides of base 273, and right branch base 279 has side rails 281 and 283. Open proximal end 280 and distal end 278 which are at 90 degrees relative to one another and distal end 282 which is 22.5 degrees are used to connect other straight or curved track sections to establish a present invention track system. Rail 277 and side rail 281 has a gap for right exit with gate 285 positioned in the gap. Gate 285 may be moved in an arc with hinge member 287 so as to close the main track and open a right exit or vise versa. Gate 285 may be operated manually or by motor or electromagnetic, by wire or wirelessly.

Figure 16:
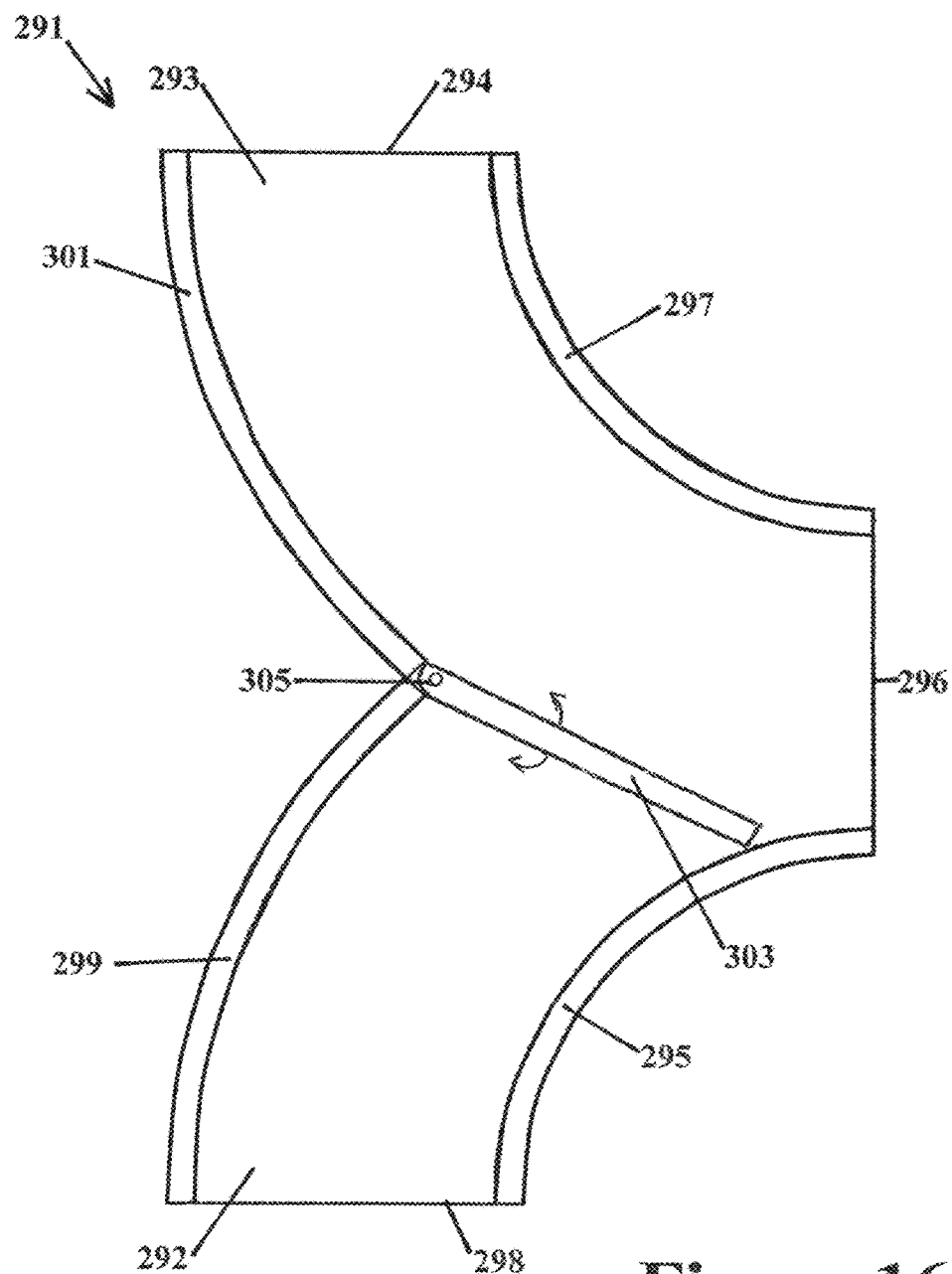
FIG. 16 shows one example of a split-T system connecting track section of the present invention multitrack storage system.

FIG. 16 shows one example of a split T system track section 291 of the present invention multitrack storage system. Section 291 has a left branch and a right branch with main base 292 and 293, as shown, with rails 295 and 299 on the left, and rails 297 and 301 on the right. Open proximal end 296 and distal ends 294 and 298 which are all at 90 degrees relative to one another are used to connect other straight or curved track sections to establish a present invention multitrack storage system. Gate 303 has a hinge 305 and moves from left to right in an arc or vise versa to open the left branch and close the right branch, or vise versa. Gate 303 may be operated manually or by motor or electromagnetic, by wire or wirelessly.

Figure 17:
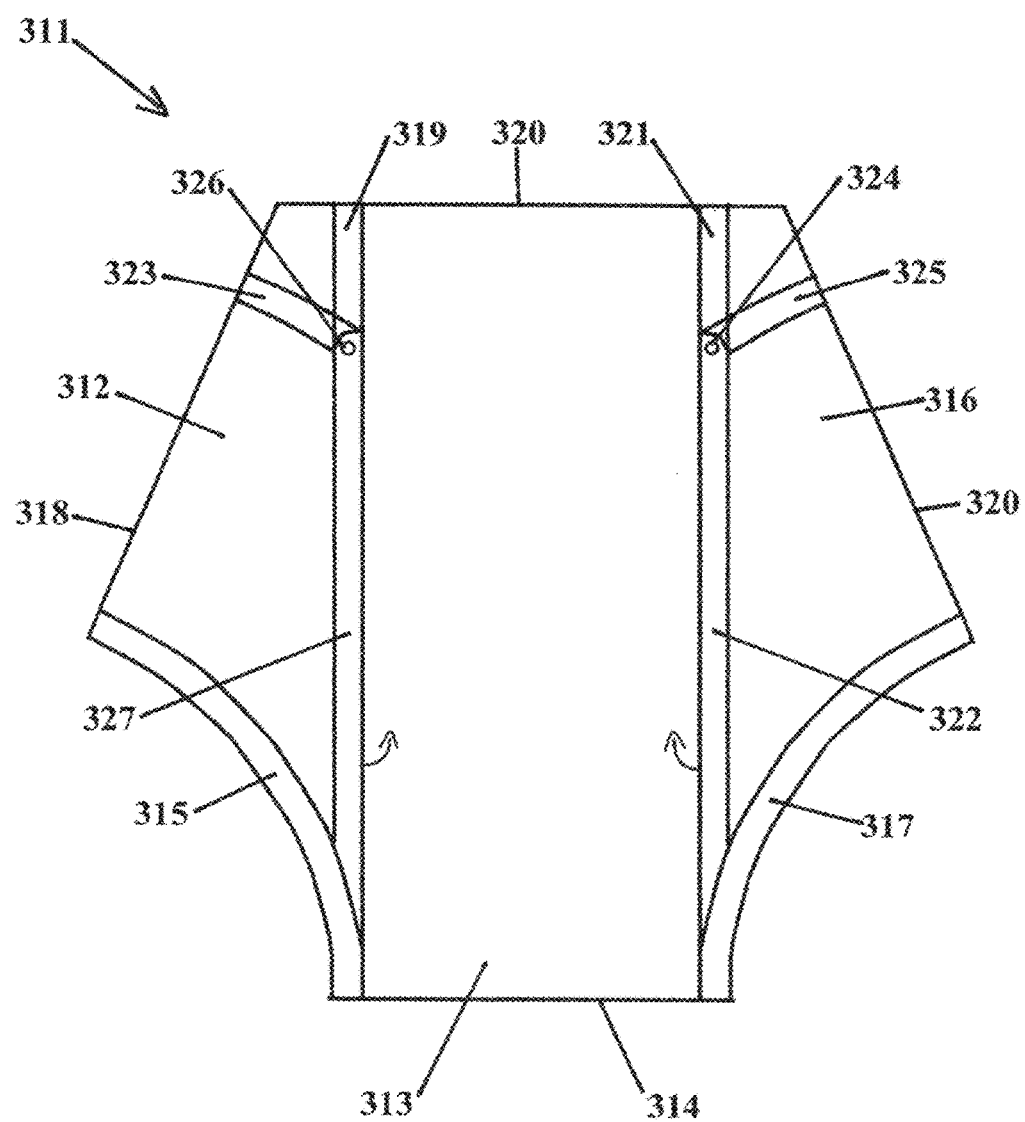
FIG. 17 shows one example of a Tri-Path system which combines left, right and straight exit track sections of the present invention multitrack storage system.

FIG. 17 shows one example of a Tri-Path system which combines left, right and straight exit track section 311 of the present invention multitrack storage system. It includes a main base 313 with left and right branch bases 312 and 316. Straight rails 319 and 321 are on opposing sides of base 313. Left and right side branch bases have side rails 315, 323 and 317, 325. Open proximal end 314 and distal end 320 which are 90 degrees relative to one another and distal ends 318 and 320 which are 22.5 degrees are used to connect other straight or curved track sections to establish a present invention multitrack storage system. Left rail 319 and side rail 323, as well as right rail 321 and side rail 325 have gaps for left and right exit gates 327 and 322 positioned in the gaps. Gates 327 and 322 may be moved in an arc with hinges 326 and 324 so as to close the main track and open the left or right exit or vise versa. Gates 327 and 322 may be operated manually or by motor or electromagnetic, by wire or wirelessly. Only one gate should be operated at a time to open the left or the right branch, as needed.

Figure 18:
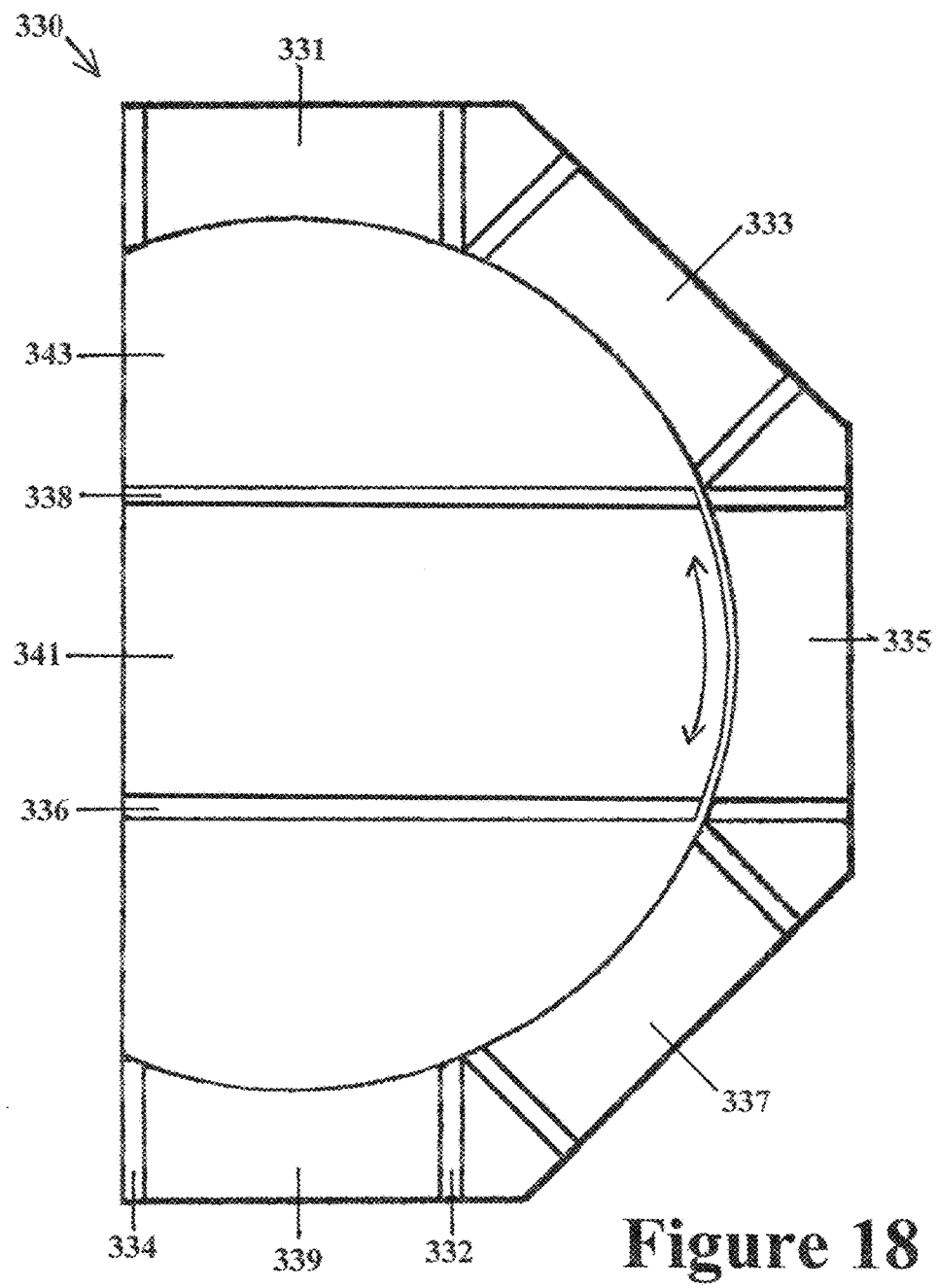
FIG. 18 shows one example of a distribution hub central terminus turn table of the present invention multitrack storage system.

FIG. 18 shows one example of a distribution hub central terminus turn table 330 of the present invention multitrack storage system. Distribution hub 330 has a fixed outer section with starter tracks 331, 333, 335, 337 and 339. The base circle component 343 is the base which supports and guides the rotable nesting receiver section 341. The nesting receiver section has side rails 336 and 338. A bin is placed on nesting receiver section 341 and then the nesting receiver section 341 is rotated to align with a chosen rack for subsequent movement of the bin up or down the selected track.

Figure 19:
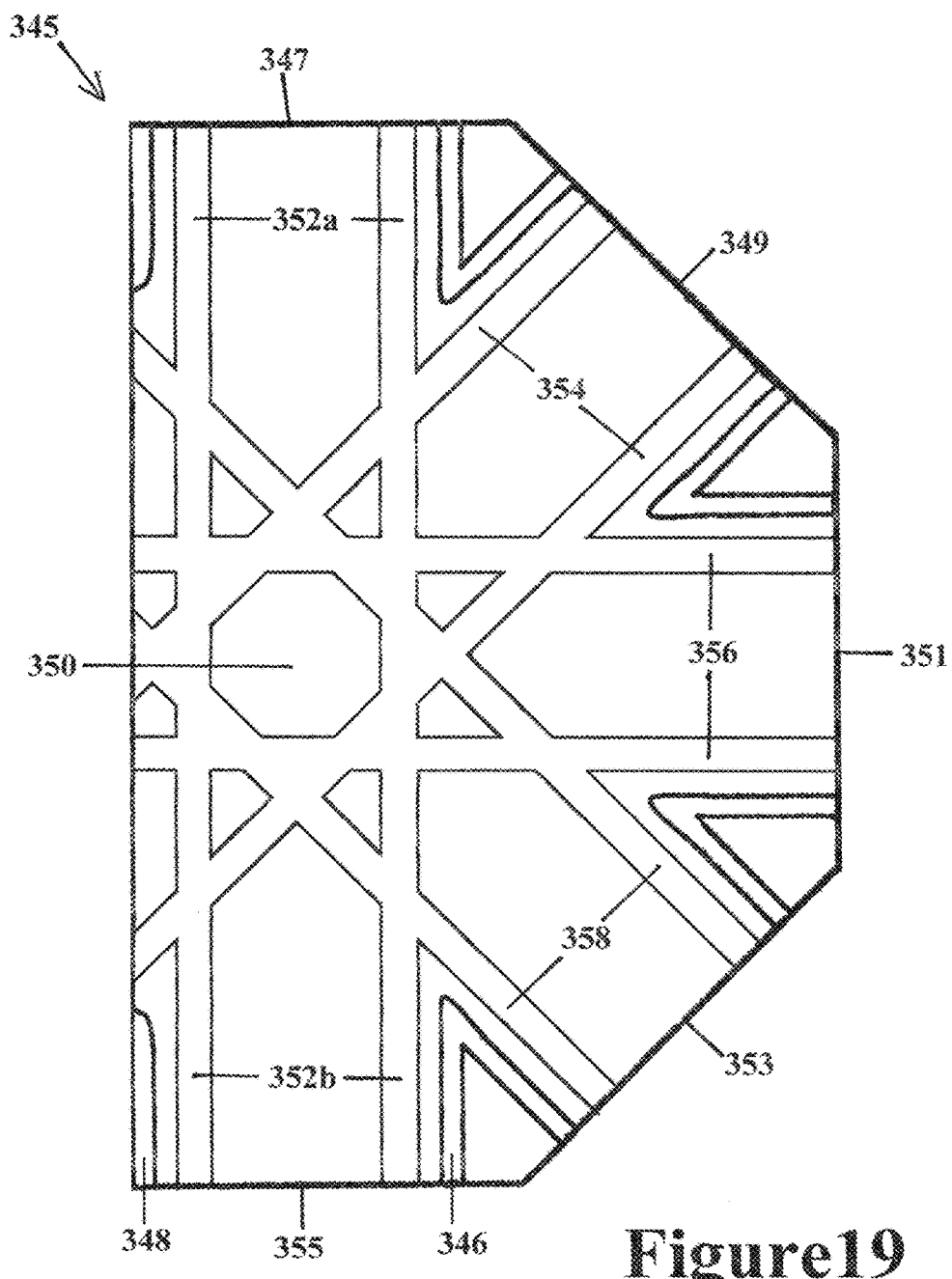
FIG. 19 shows one example of a distribution hub central terminus manifold of the present invention multitrack storage system.

FIG. 19 shows another example of a distribution hub central terminus manifold, manifold 345 of the present invention multitrack storage system. Manifold 345 has the same fixed structure as manifold 330 of FIG. 18 above, but without a movable turn table. Thus, manifold 345 has a main base 350 with starting tracks 347, 349, 351, 353 and 355 travelling off in different directions for assemblage with various track sets (not shown here).There are concomitant rail sections, such as rails 346 and 348. In the center is a plurality of track grooves for receiving bin wheels so that bins may be strategically positioned to move forward into a selected track. As shown, the groove sets facing their respective tracks are groove sets 354, 356 and 358, as well as opposite ends of the same groove set facing opposing tracks, being groove set segment 352a for track 347 and groove set segment 352b for track 355. Instead of the grooves, an open flat area could be used and this is shown in FIG. 20.

Figure 20:
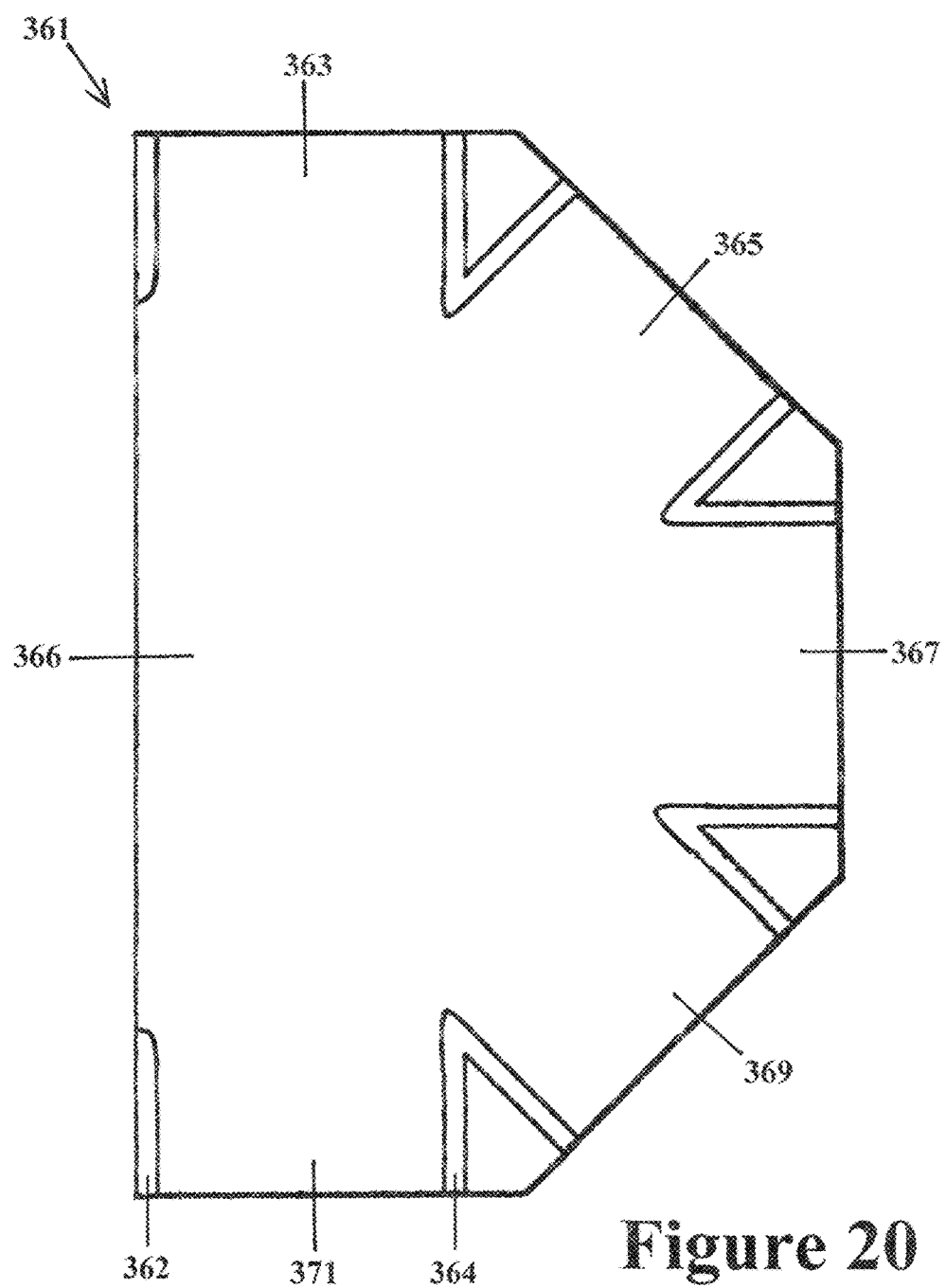
FIG. 20 shows one example of an alternative distribution hub central terminus manifold of the present invention multitrack storage system.

FIG. 20 shows one example of an alternative distribution central terminus manifold 361 of the present invention multitrack storage system. Manifold 361 is the same as manifold 345 above, except the grooves have been eliminated and a user may merely place a bin on the open area 366 and aim it and direct it toward a chosen track. Starting tracks 363, 365, 367, 369 and 371, travelling off in different directions for assemblage with various track sets. There are concomitant rail sections, such as rails 362 and 364.

Figure 21:
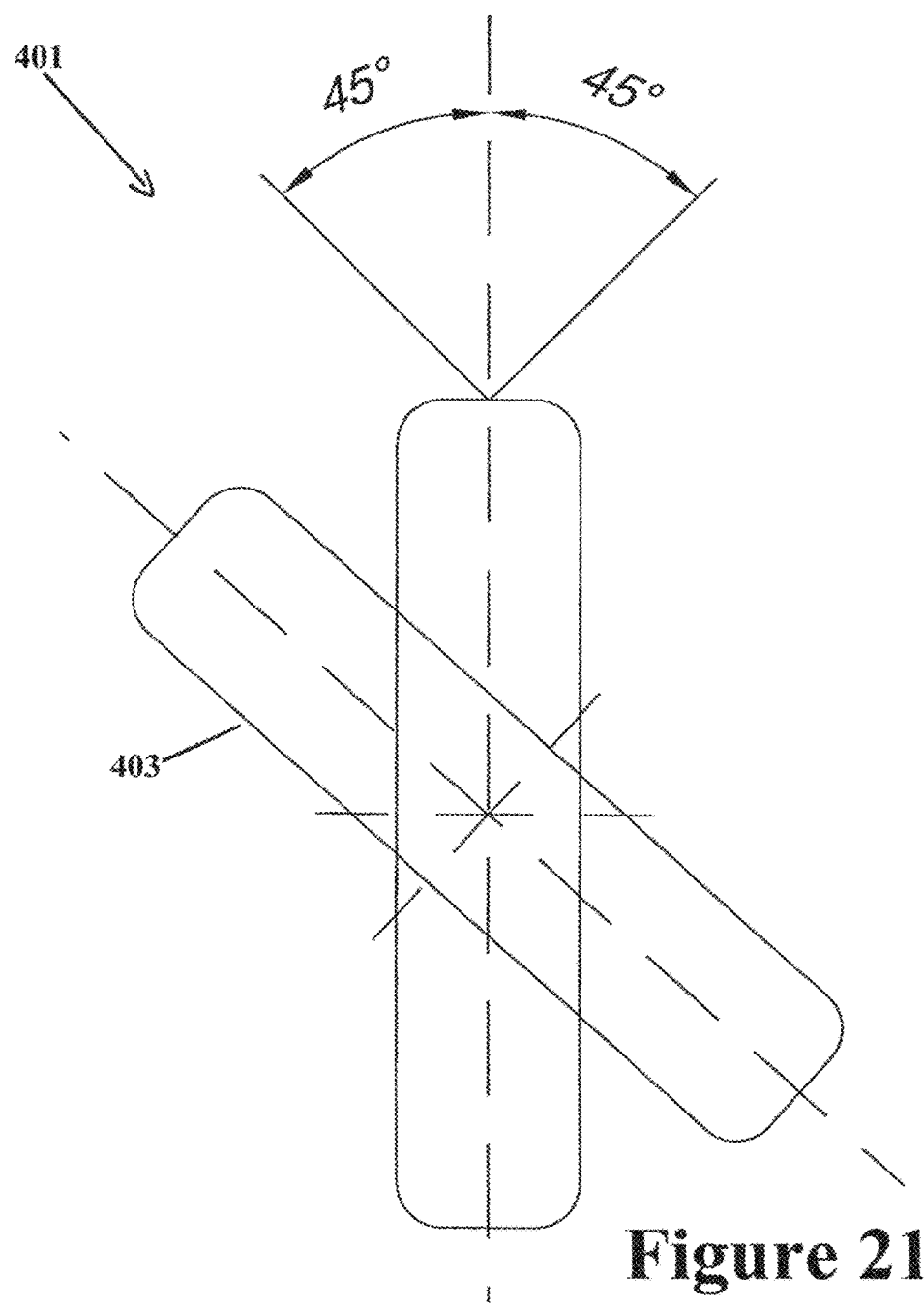
FIGS. 21 and 22 show floor wheel and side wheel angle ranges of a present invention multitrack storage system.
Figure 22:
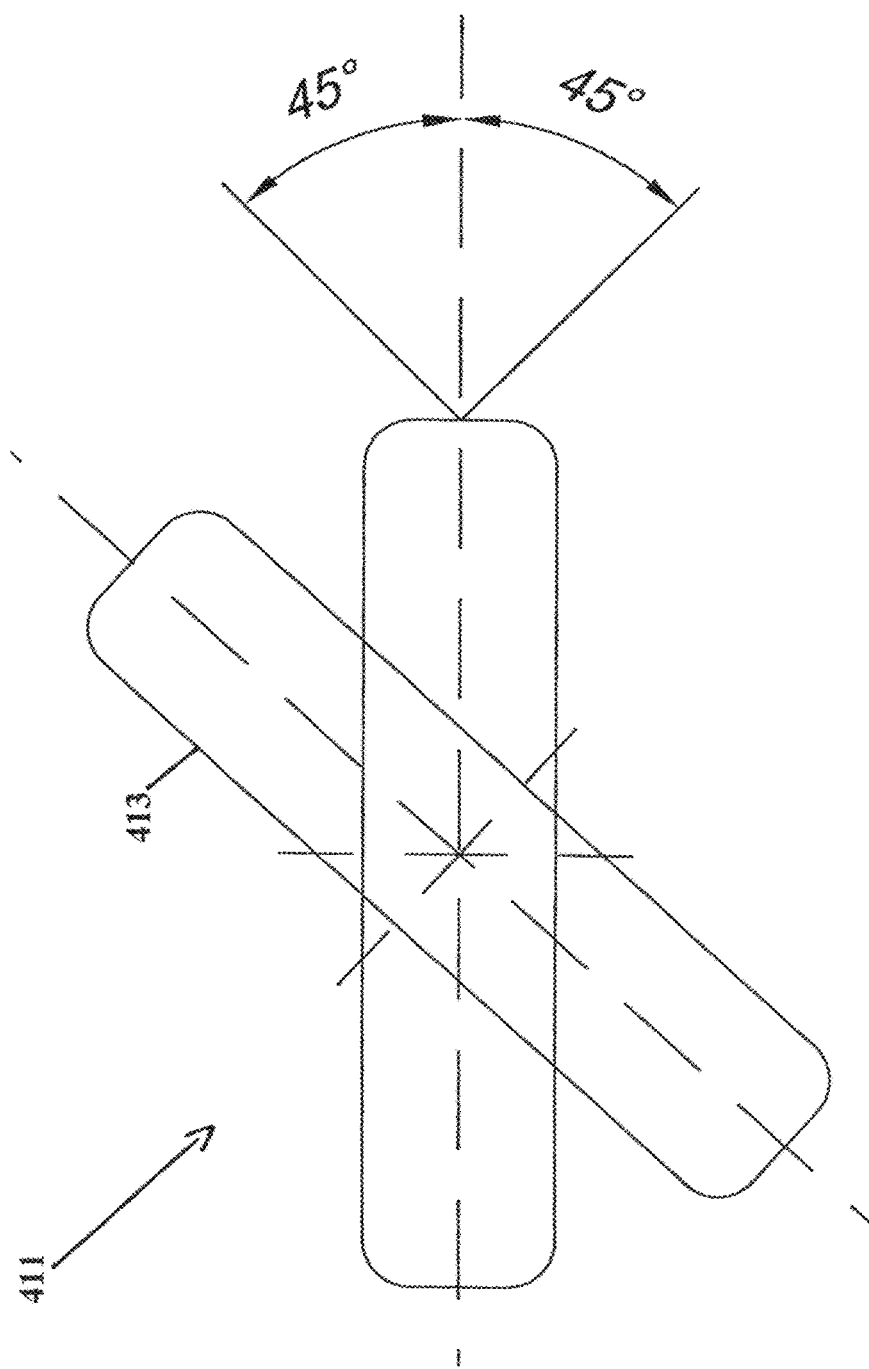

FIGS. 21 and 22 show floor wheel and side wheel angle ranges. In FIG. 21, vertical wheel 401 may be perfectly vertical, as shown, or tilted 403, but is preferably near vertical or vertical. The outer ranges of tilting are 45 degrees left or right, and preferably no more than 20 degrees left or right. In FIG. 22, horizontal wheel 411 may be perfectly horizontal, as shown, or tilted 413, but is preferably near horizontal or horizontal. The outer ranges of tilting are 45 degrees down or up, and preferably no more than 20 degrees down or up.

Figure 23:
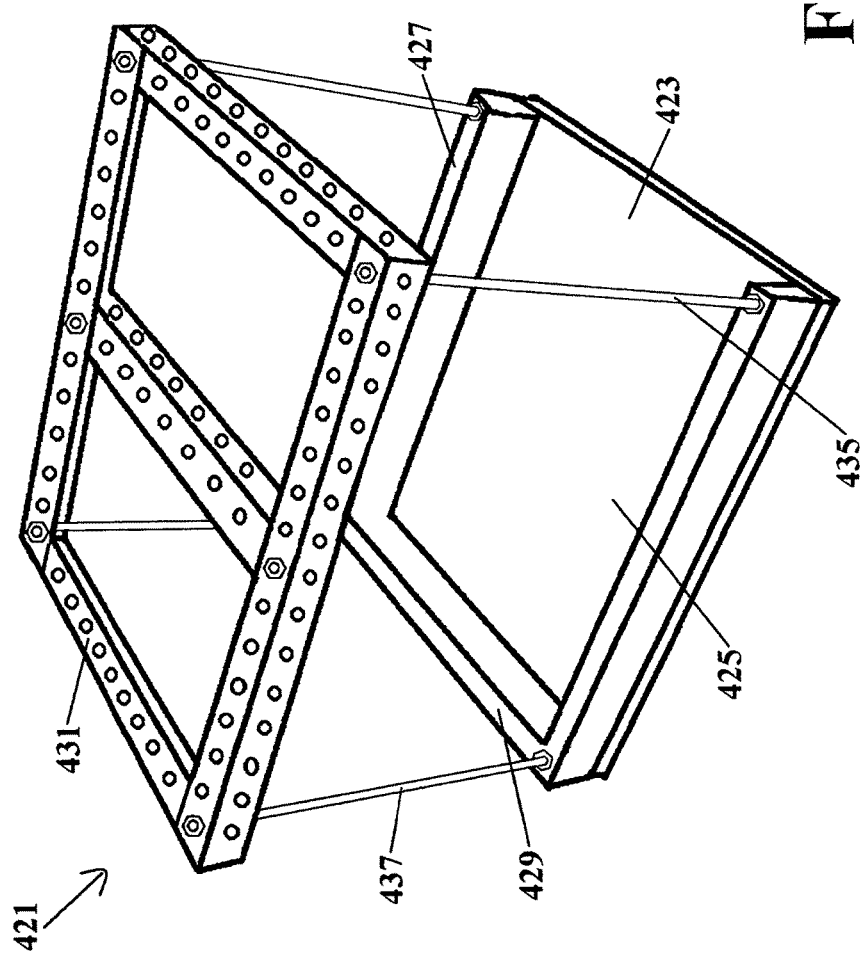
FIG. 23 shows an oblique view of a storage bin lift for transferring bins from one level to another level as well as mating with high level tracks for transferring bins to them of the present invention multitrack storage system.

FIG. 23 shows an oblique view of a storage bin lift assembly 421 of the present invention multitrack storage system for transferring bins from one level to another level as well as mating with high level tracks for transferring bins to them. Lift 421 has a support base 423, side rails 425 and 427 and end rail (bumper) 429. There are four vertical support members, such as posts 435 and 437. This lift 421 may have a pump shaft, a scissors shaft, a block and tackle rope, a motorized drive, such as an overhead motor, or a winch or any other power lifting mechanism. In some preferred embodiments, a ceiling mounted winch is sufficient and efficient.

Figure 24:
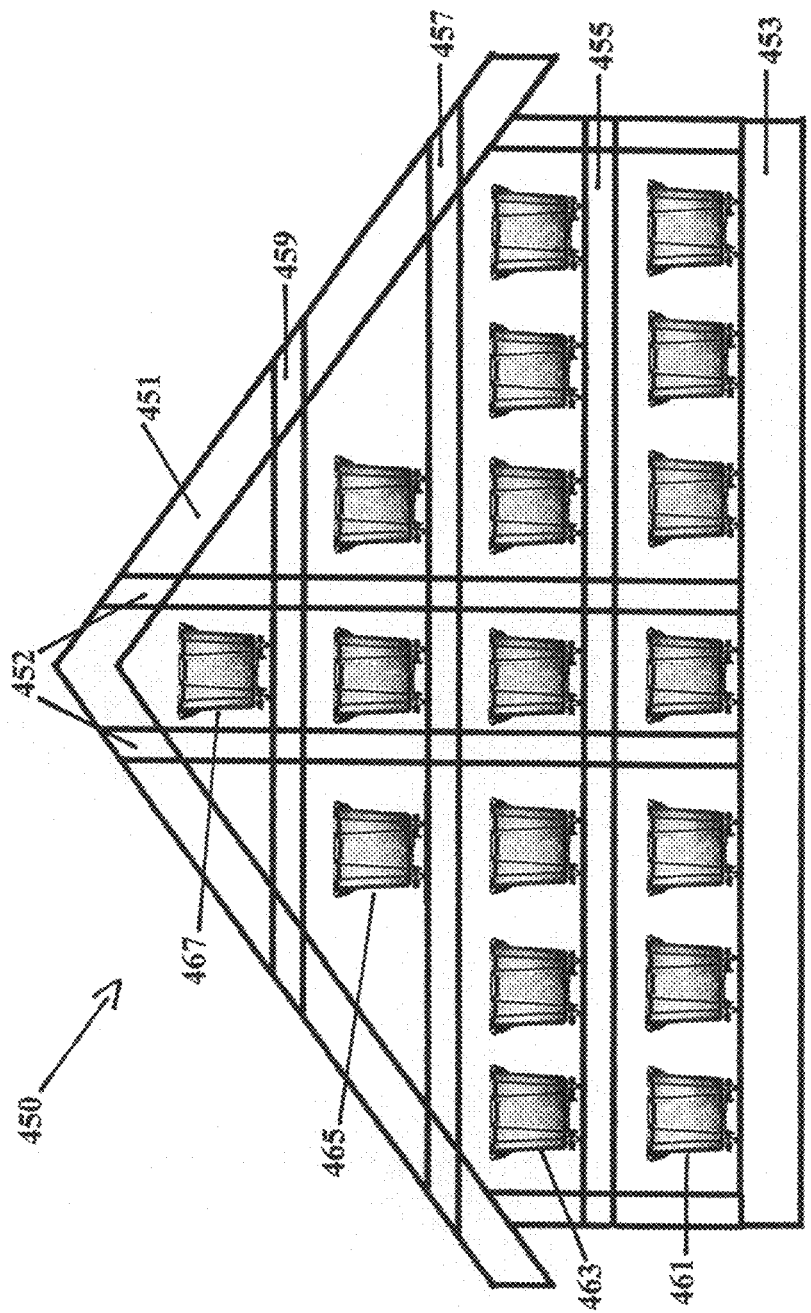
FIG. 24 shows a schematic diagram of multilevel track systems for a sloped roof attic or other structures of the present invention multitrack storage system.

FIG. 24 shows a diagram 450 of multilevel track arrangement of a present invention multitrack storage system for a sloped roof attic of other structure. Attic sloped rafters, such as rafter 451 creates a triangle front view, wherein due to diminishing widths upwardly, fewer sets of tracks can fit side by side. Therefore, level one 453 in FIG. 24 has five sets of tracks with bins, such as bin 461; level two 455 in FIG. 24 has four sets of tracks with bins, such as bin 463; level three 457 in FIG. 24 has three sets of tracks with bins, such as bin 465; level four 459 in FIG. 24 has two sets of tracks with bins, such as bin 467. Multiple levels, as in this figure, may be established by suspensions from the top down, or supports from the bottom up, or combinations. In this FIG. 24, the level one 453 tracks are supported bottom up, resting on floor joists, whereas the other levels shown are suspended from above, i.e., suspended from the rafters. Lift mechanisms, not shown, may be used to move bins to different levels, and in some cases, especially trap door attics, the lift may be winch driven and further be used to lift bins from the house or building floor below the attic.

Figure 25:
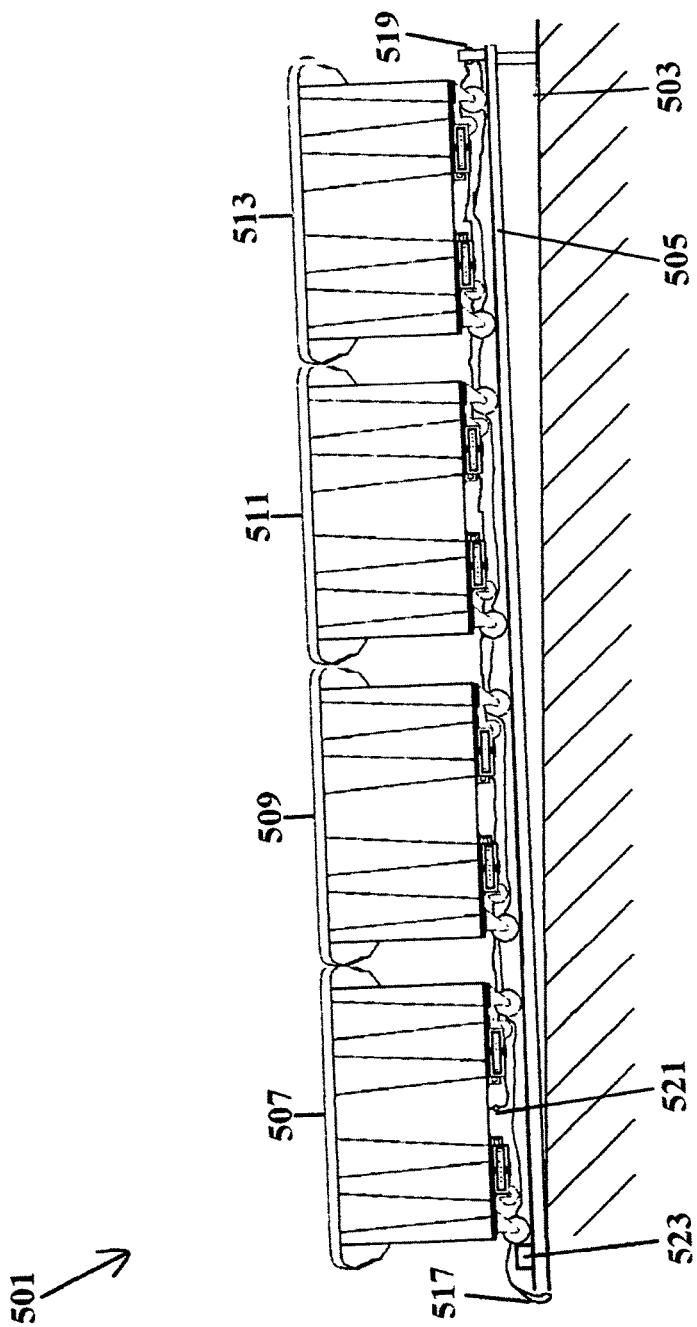
FIG. 25 shows a bin movement mechanisms for tracks where a portion of the system slopes upwardly away from the proximal end and downwardly away from the distal end of a present invention multitrack storage system.
Figure 26:
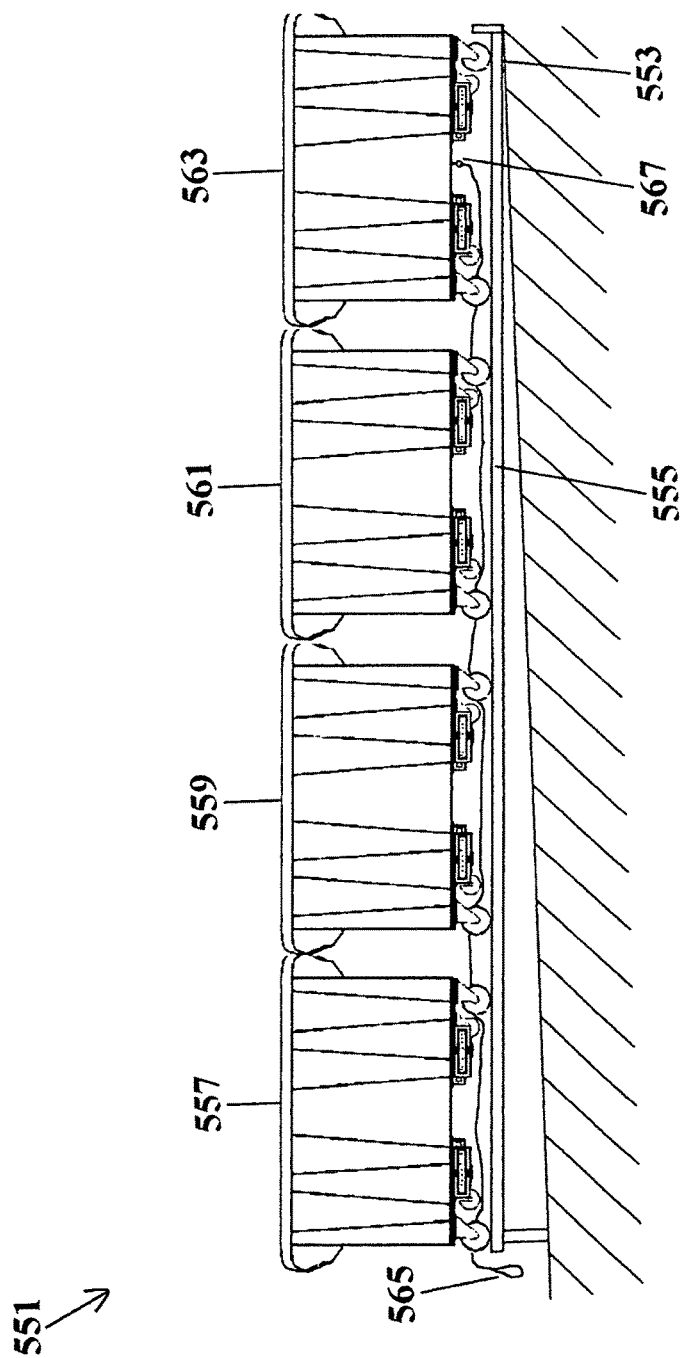
FIG. 26 shows a bin movement mechanisms for tracks where a portion of the system slopes downwardly away from the proximal end and upwardly from the distal end of a present invention multitrack storage system.

FIGS. 25 and 26 show bin movement mechanisms for tracks of present invention multitrack storage system, sloped upwardly away and dowardly away from the proximal end of the tracks. In FIG. 25, present invention system 501 is shown in part (central terminus and other sets of tracks not included) and rests on floor 503. It includes a plurality of track sections shown simplistically as a single elongated track 505. It is sloped upwardly away from the proximal end (left in the figure) and has wheeled bins 507, 509, 511 and 513 on track 505. These wheeled bins are similar to those described above but contain eyelets on their bottoms such as eyelet 521 on bin 507. Bin 507 is the lead bin and is connected to rope 517 which travels to the distal end, then over pulley 519 and then back to the proximal end of track 505 by lowering (releasing) or pulling on rope 517, a user will move the entire chain of bins up or down track 505. As an alternative, or in addition to the rope, periodic brakes such as, brake 523 may be employed to hold bins in place against gravity. These brakes may be manually operated, mechanically operated or electronically operated. Controls may be mechanically linked, wired or wireless.

FIG. 26 shows a bin movement mechanism for tracks of the present invention multitrack storage system. Conversely, in FIG. 26, where a portion of system 551 is shown, track 555 slopes downwardly away from the proximal end, resting on floor 553. Because this is sloped downwardly and away the eyelet on the most distant bin from the proximal end is connected to the rope 565 and by a user pulling on the rope 565, the entire chain of bins 557, 559, 561 and 563 are pulled toward the proximal end. By releasing the rope 565 slowly, all of the bins will move downhill by gravity toward the distal end.

Figure 27:
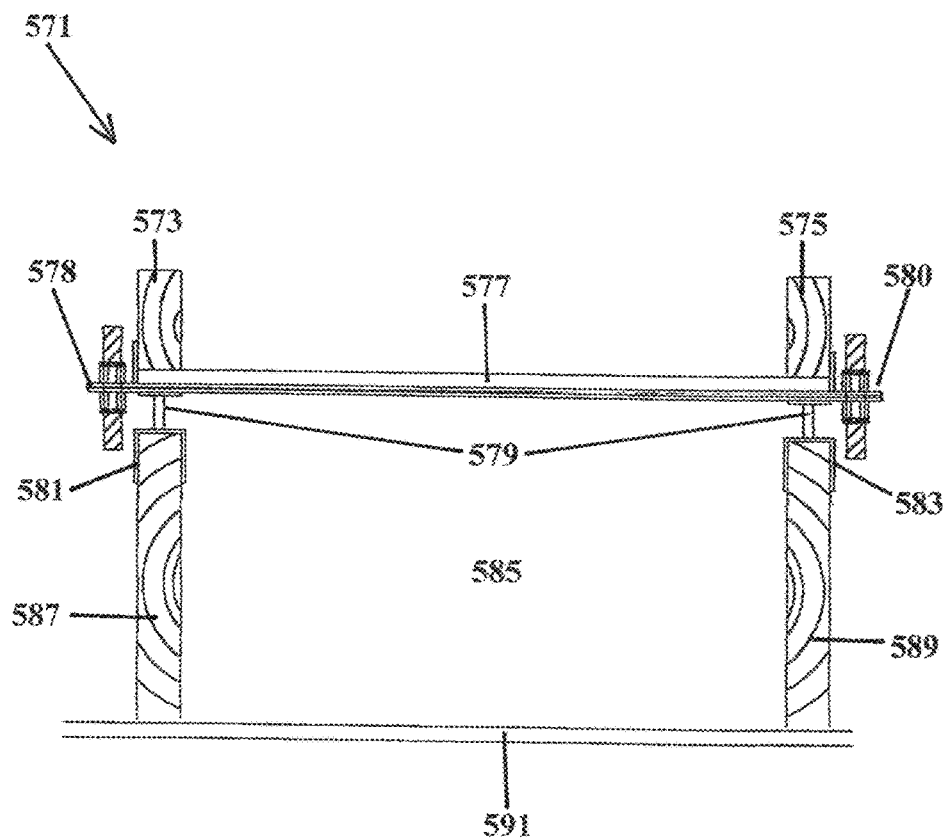
FIG. 27 shows a ceiling joist mount system to support various tracks in an attic where there is no floor for a present invention multitrack storage system.

FIG. 27 shows a ceiling joist mount for the present invention multitrack storage system. The ceiling joist mount 571 is used to support various tracks in an attic where there is no floor in extended parts of the attic and insulation between the ceiling joists. Using the ceiling joist mount 571 allows the use of the multitrack storage system without enduring the cost of installing a floor. Sheetrock 591 is attached to ceiling joists 587 and 589 with insulation 585 filling the area between the joists. The mounting brackets 581 and 583 are attached to ceiling joists 587 and 589. Adjusters 579 are used for leveling and elevating tracks. Track support 578 and 580 secures the track to the brackets 581 and 583. The track has a base 577 and side rails 573 and 575.

Figure 28:
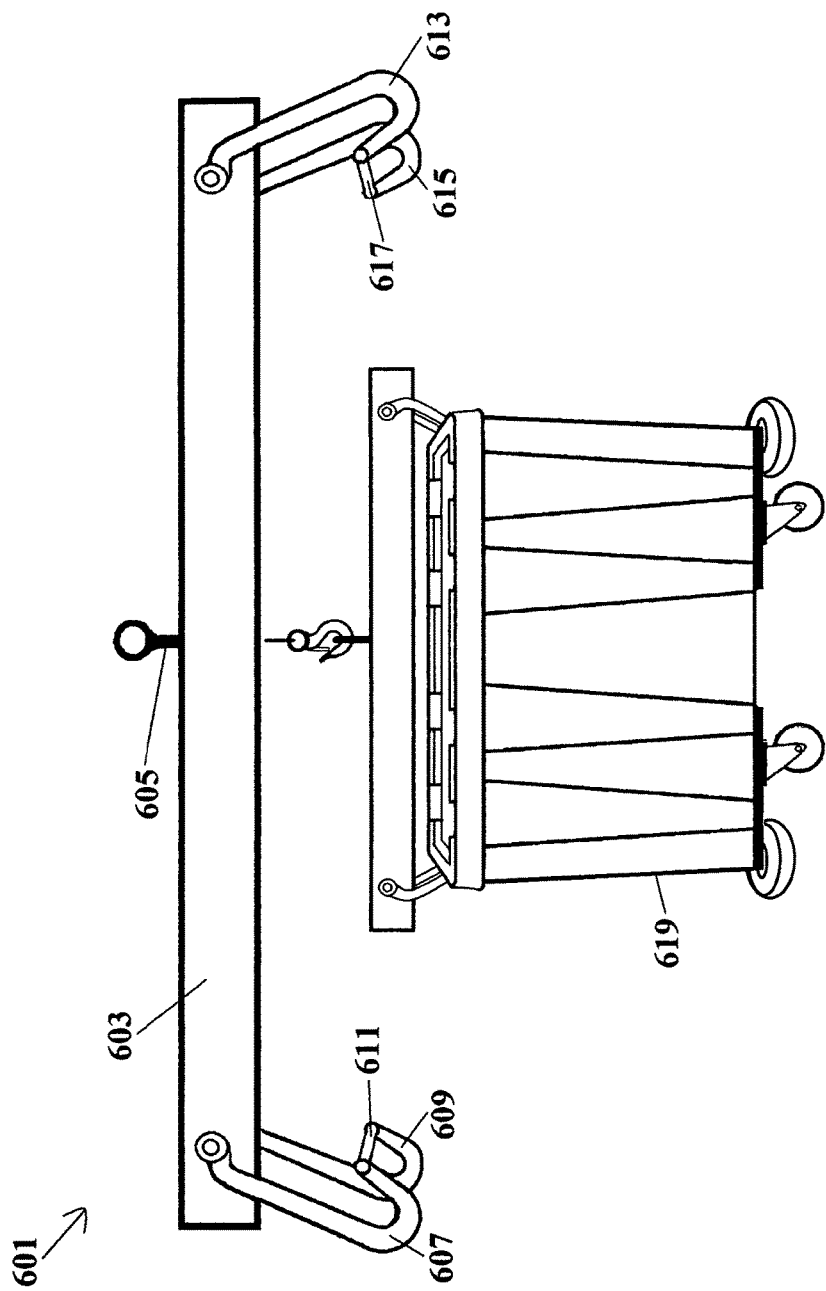
FIG. 28 shows a bin lift hook assembly for lifting heavy bins safely from a floor through the attic or ceiling access point of the present invention multitrack storage system.

FIG. 28 shows a bin lift hook assembly for the present invention multitrack storage system. The bin lift hook assembly 601 is used for lifting heavy bins from a floor through the ceiling access point into an attic or other areas where the multitrack storage system may be installed. The main beam 603 can be various lengths depending on the size bin used. The hooks 607, 609, 613 and 615 are attached to the main beam and connected together by parts 611 and 617. Eyelet 605 is where the hook from the various lifting devices mentioned above would attach to.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A multitrack storage system with a central terminus, which compromises:
    a) a plurality of different sets of tracks, each of said tracks having a track base and opposing sidewalls for guiding a plurality of separate, wheeled storage bins, wherein each of said tracks constitute a groove having a predetermined width of at least X, wherein X is a width in the range of six inches to five feet, and having connection mechanisms for connecting each of said tracks to one another, said tracks having a proximal end and a distal end;
    b) a tilting mechanism in contact with at least a portion of said tracks, said tilting mechanism being for tilting said tracks an angle to a non-horizontal position;
    c) a distal end bumper at the distal end of each of said sets of tracks to prevent off track movement of any of said storage bins that may be moved thereon;
    d) said plurality of separate, wheeled storage bins, being positioned on said different sets of tracks, each storage bin having a plurality of bottom wheels and a plurality of side wheels wherein the maximum outside width of said bins, including said side wheels, as measured side to side, is less than X such that said side wheels of said storage bins nest in said tracks, said storage bin side wheels having a vertical axis of rotation within the range of minus 45 degrees to plus 45 degrees, and nesting on said track base;
    e) a bin movement mechanism connected to at least one separate, wheeled storage bin for movement thereof;
    f) a proximal end for said plurality of different sets of tracks wherein said plurality of different sets of tracks converge at said proximal end at central terminus;

wherein, a user may access items into and out of said wheeled storage bins at said central terminus and move said storage bins along one of said plurality of different sets of tracks away from said central terminus for storage.

2. The multitrack storage system of claim 1 wherein said central terminus is a turnstile that may be rotated to receive storage bins from any of said plurality of sets of tracks.

3. The multitrack storage system of claim 1 wherein said central terminus is a manifold with a plurality of converging tracks adapted to connect to each of said plurality of different sets of tracks that are reduced in number to a fewer set of tracts by said manifold.

4. The multitrack storage system of claim 1 wherein said wheeled storage bins include lids.

5. The multitrack storage system of claim 1 wherein said tracks are structurally formed of materials selected from the group consisting of wood, metal, plastic and combinations thereof.

6. The multitrack storage system of claim 1 wherein said bin movement mechanism includes at least one flexible cord having a distal end away from said central terminus and a proximal end at said central terminus.

7. The multitrack storage system of claim 6 wherein each storage bin has a distal end away from said central terminus and a proximal end closest to said central terminus, and said at least one flexible cord is connected to said distal end of said bin and there is a pulley at the distal end of said track whereby said cord travels from said distal end of said storage bin to said pulley and then returning to said central terminus.

8. The multitrack storage system of claim 6 wherein each storage bin has a distal end away from said central terminus and a proximal end closest to said central terminus, and said at least one flexible cord is connected to said proximal end of said bin and travels from said proximal end of said storage bin to said central terminus.

9. The multitrack storage system of claim 1 wherein said storage bin side wheels have a vertical axis of rotation within the range of minus 20 degrees to plus 20 degrees.

10. The multitrack storage system of claim 1 wherein said storage bin side wheels have a vertical axis of rotation.

11. The multitrack storage system of claim 1 wherein said plurality of different sets of tracks includes at least one set of branch tracks and at least one switch gate.

12. The multitrack storage system of claim 11 wherein said switch gate is manually operable.

13. The multitrack storage system of claim 11 wherein said switch gate is a motorized switch gate.

14. The multitrack storage system of claim 13 wherein said motorized switch gate is wirelessly operable.

15. The multitrack storage system of claim 1 wherein said bin movement mechanism is a motorized bin movement mechanism.

16. The multitrack storage system of claim 1 wherein said plurality of different sets of tracks includes at least one set of tracks at a first level, being a first floor level, and at least one set of tracks at a second level, being a second floor level.

17. The multitrack storage system of claim 16 wherein said multitrack storage system further includes at least one bin transporting elevator lift to move said storage bins from said first floor level to said second floor level and vice versa.

18. The multitrack storage system of claim 16 wherein said elevator lift includes a support base and a power winch.

19. The multitrack storage system of claim 1 wherein said tracks have vertical sidewalls.

* * * * *